US007834890B2

(12) United States Patent
Fujiki et al.

(10) Patent No.: US 7,834,890 B2
(45) Date of Patent: Nov. 16, 2010

(54) INFORMATION PROCESSING METHOD AND IMAGE PROCESSING METHOD

(75) Inventors: Masakazu Fujiki, Kanagawa (JP); Toshikazu Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 10/964,674

(22) Filed: Oct. 15, 2004

(65) Prior Publication Data
US 2005/0131857 A1    Jun. 16, 2005

(30) Foreign Application Priority Data
Oct. 17, 2003 (JP) ............... 2003-358520
Oct. 17, 2003 (JP) ............... 2003-358521

(51) Int. Cl.
G09G 5/00    (2006.01)
G06T 15/00    (2006.01)
G06K 9/00    (2006.01)
A61B 5/05    (2006.01)
A61B 8/00    (2006.01)

(52) U.S. Cl. ............... 345/619; 345/419; 382/128; 382/130; 382/132; 600/407; 600/410; 600/425; 600/443

(58) Field of Classification Search ............... 345/619, 345/419; 382/128, 130–132; 600/407, 410, 600/425, 443
See application file for complete search history.

(56) References Cited

U.S. PATENT DOCUMENTS 5,623,588 A * 4/1997 Gould ............... 715/787

(Continued)

FOREIGN PATENT DOCUMENTS

JP    08-235231    9/1996

(Continued)

OTHER PUBLICATIONS

G. Hesina et al., "Distributed Open Inventor: A Practical Approach to Distributed 3D Graphics", in Proc. of ACM Symposium on Virtual Reality Software and Technology (VRST '99) pp. 74-81, 1999.

(Continued)

*Primary Examiner*—Xiao M Wu
*Assistant Examiner*—Tize Ma
(74) *Attorney, Agent, or Firm*—Fitzpatrick, Cella, Harper & Scinto

(57) ABSTRACT

An image processing method includes an object level acquisition step of acquiring an object level set for each computer graphics object, a display step of displaying a slide bar with a movable cursor to allow a user to set a user level by manipulating the cursor, and a user level acquisition step of acquiring a user level set by the user, based on a position of the cursor of the slide bar. In addition, a rendering step renders a virtual space including each computer graphics object by rendering each computer graphics object to have its visibility attribute depending on its object level acquired in the object level acquisition step and the user level. The rendering step renders a computer graphics object with an object level less than the user level as a visible object and renders a computer graphics object with an object level equal to or larger than the user level as an invisible object, and the rendering step is repeatedly performed in response to the position of the cursor being changed by the user.

2 Claims, 33 Drawing Sheets

U.S. PATENT DOCUMENTS

| | | | | |
|---|---|---|---|---|
| 5,682,506 | A * | 10/1997 | Corby et al. | 345/419 |
| 5,859,966 | A * | 1/1999 | Hayman et al. | 726/23 |
| 5,872,924 | A | 2/1999 | Nakayama et al. | 395/200.35 |
| 5,977,978 | A * | 11/1999 | Carey et al. | 345/419 |
| 5,982,388 | A * | 11/1999 | Nakagawa | 345/473 |
| 6,160,907 | A * | 12/2000 | Robotham et al. | 382/154 |
| 6,222,558 | B1 * | 4/2001 | Berg | 345/619 |
| 6,348,927 | B1 * | 2/2002 | Lipkin | 345/619 |
| 7,102,651 | B1 | 9/2006 | Louveaux et al. | 345/629 |
| 7,151,546 | B1 | 12/2006 | Louveaux | 345/619 |
| 2001/0040571 | A1 * | 11/2001 | Miller | 345/419 |
| 2002/0109684 | A1 * | 8/2002 | Repin et al. | 345/424 |
| 2002/0154174 | A1 * | 10/2002 | Redlich et al. | 345/848 |
| 2005/0179617 | A1 | 8/2005 | Matsui et al. | 345/7 |
| 2005/0228250 | A1 * | 10/2005 | Bitter et al. | 600/407 |

FOREIGN PATENT DOCUMENTS

| | | |
|---|---|---|
| JP | 08-305663 | 11/1996 |
| JP | 10-240965 | 9/1998 |
| JP | 2000-057373 | 2/2000 |
| JP | 2001-209819 | 8/2001 |
| JP | 2001-209826 | 8/2001 |
| JP | 2001-312644 | 11/2001 |
| JP | 2001-0318818 | 11/2001 |
| JP | 2002-024298 | 1/2002 |
| WO | WO 03/045222 A2 * | 6/2003 |

OTHER PUBLICATIONS

Japanese Office Action dated Apr. 6, 2009, in related corresponding Japanese Patent Appln. No. 2003-358521.

Japanese Office Action dated Apr. 24 2009, in related corresponding Japanese Patent Appln. No. 2003-358520.

* cited by examiner

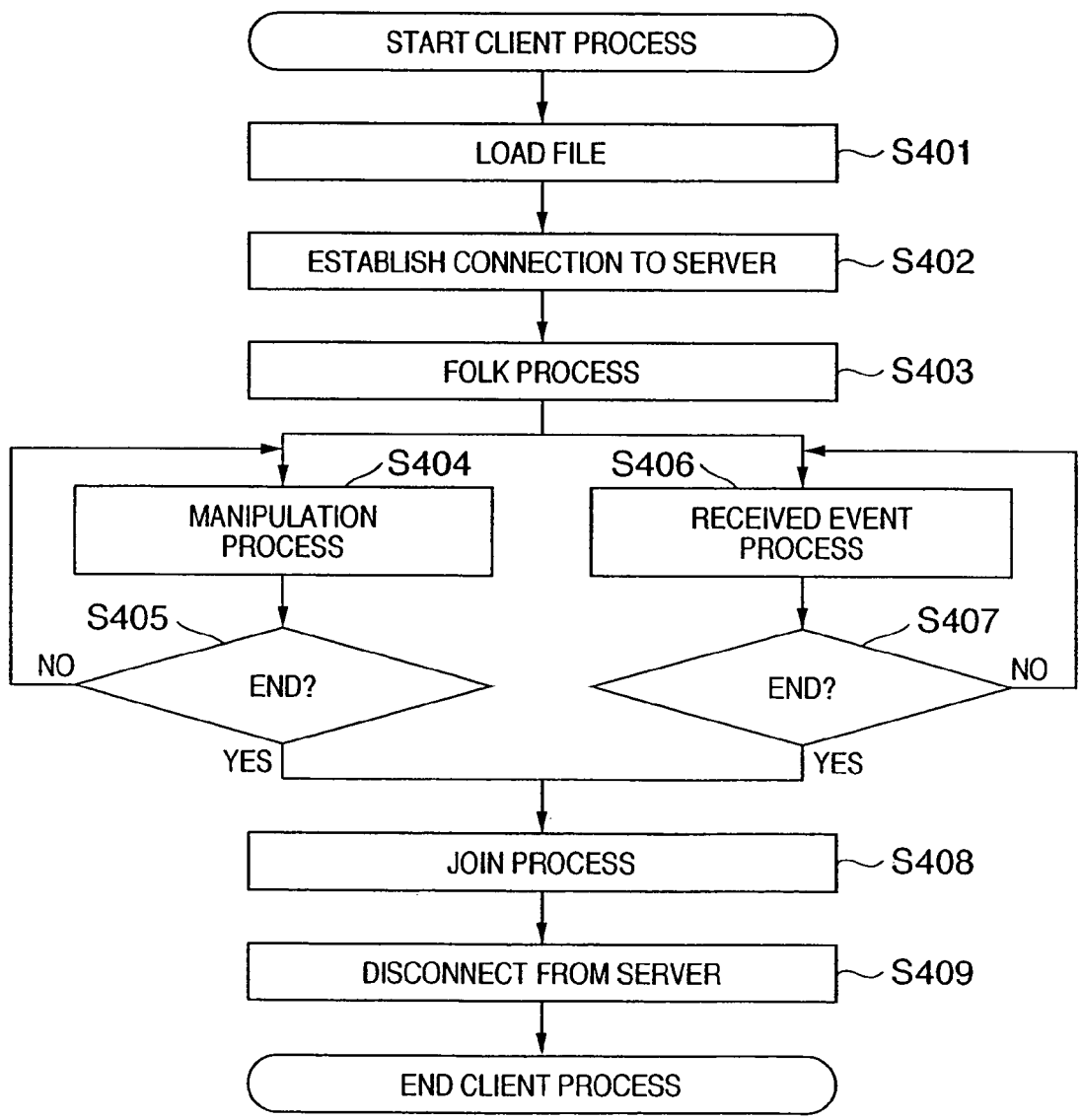
F I G. 21

F I G. 25
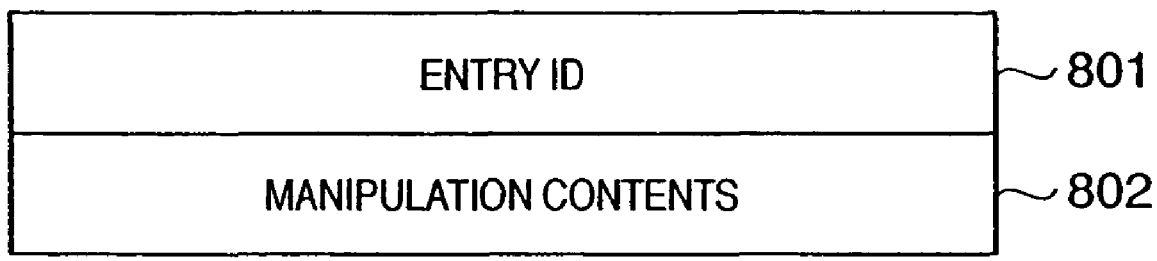

F I G. 28
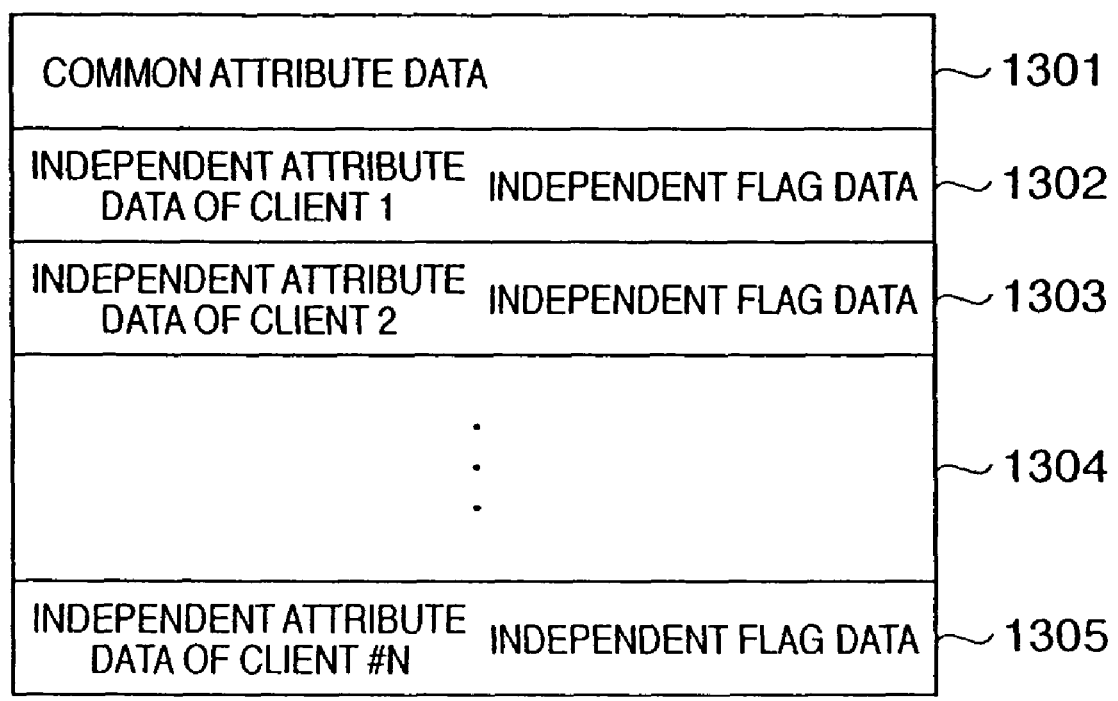

F I G. 31
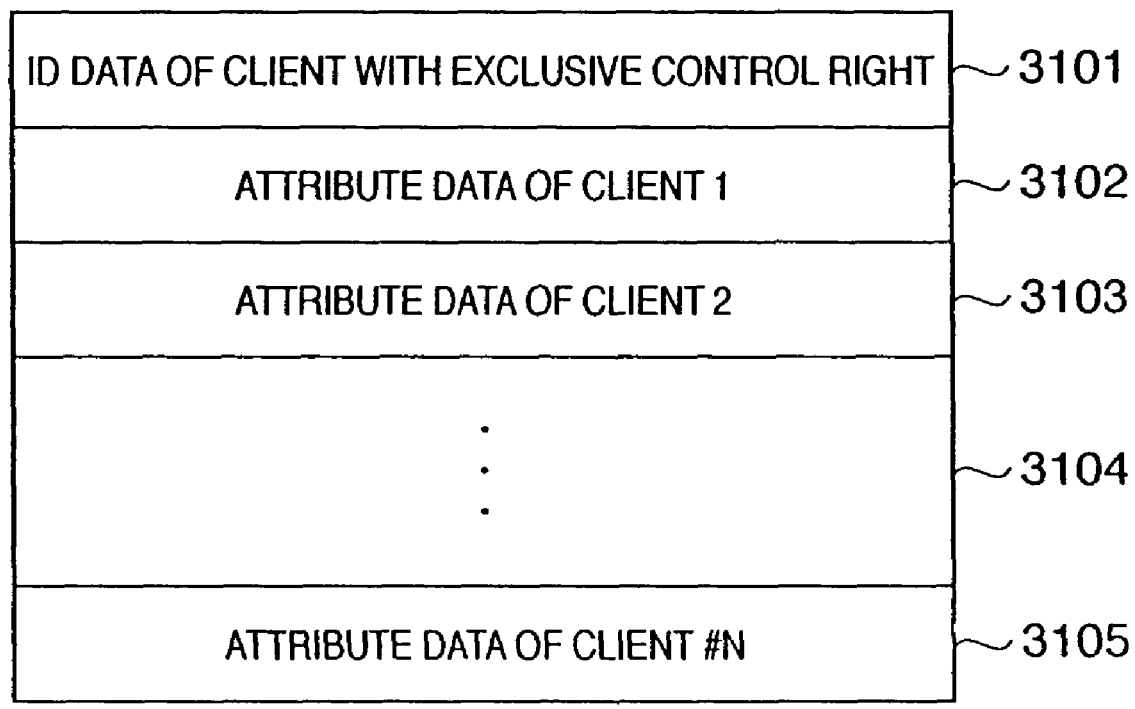

INFORMATION PROCESSING METHOD AND IMAGE PROCESSING METHOD

FIELD OF THE INVENTION

The present invention relates to a CG (Computer Graphics) technique and, more particularly, to a technique for presenting a virtual space by CG based on attributes that describe the virtual space.

The present invention also relates to a technique for sharing data of a virtual space used by CG among a plurality of terminals.

BACKGROUND OF THE INVENTION

Conventionally, a CG (Computer Graphics) technique that generates a projected image on a virtual space on the basis of attributes that describe the virtual space is known (e.g., James D. Foley, "Computer Graphics: Principles and Practice (Systems Programming)" Addison-Wesley, ISBN: 0201948406). Along with the advance and price-reduction of computer technologies, the CG technique is used in various fields.

Note that "attribute" in this specification is each individual information that specifies a virtual space, and represents, for example, the position, orientation, color, and opacity of a virtual object, the color and irradiation direction of illumination, space structure (e.g., a hierarchical structure in which a pot is placed on a desk, and the pot moves together with movement of the desk), and the like.

As tools for designing a virtual space and virtual object by applying the CG technique, a 3DCAD (3-Dimensional Computer Aided Design) tool and 3D (3-Dimensional) CG tool are known. For example, OneSpace Designer available from CoCreate Software, Inc. is known as an example of the 3DCAD tool, and Maya available from Alias Systems Corp. is known as an example of the 3DCG tool. These tools allow a designer to visually confirm an object to be designed by displaying a projected image of this object on the display screen. With these tools, if all components (elements) which form the object to be designed are displayed in an arbitrary design process, it is often difficult to determine necessary information on the screen. Therefore, the operator designs while switching the attributes (e.g., visible/invisible of components) of components as needed. This attribute switching operation requires two steps: (1) select a component; and (2) change the attribute of the component.

In this way, upon switching the attributes of components which form a virtual space or virtual object, at least two operation steps are required per component. Hence, in order to switch the attributes of a large number of components, many operations are required, resulting in troublesome processes.

As the computer networks are prevalently used, it is a common practice to share information by a plurality of computer terminals to attain operations. Against such background, a system that allows different computer terminals to share a single 3D virtual space by sharing identical virtual space information is realized (e.g., G. Heshina et. al.: "Distributed Open Inventor: A Practical Approach to Distributed 3D Graphics", in Proc. of the ACM Symposium on Virtual Reality Software and Technology (VRST'99), pp. 74-81, 1999). As application examples of such system, remote meeting systems, network games, cooperative design systems, and the like may be proposed.

Sharing of a single virtual space by different terminals is implemented by sharing information that specifies a virtual space. However, this prior art allows all terminals to set common values as information to be shared, and that information cannot be set as different values depending on terminals that use the information.

On the other hand, some or all of attributes of information which specifies a virtual space are not shared by terminals, and control may be made so that each terminal applies its own data to these attributes. However, non-shared data of each terminal cannot be accessed by another terminal.

Furthermore, with the technique described by G. Heshina et al., a hierarchical data structure which specifies a virtual space must be changed to switch between data shared and non-shared states.

SUMMARY OF THE INVENTION

The present invention has been made in consideration of the conventional problems, and has as one of its objects to change attributes of a plurality of CG objects at the same time by a simple method.

It is another object of the present invention to allow a plurality of clients to access attribute data to which an independent value can be assigned for each client in a virtual space sharing system in which virtual space data is shared by a plurality of clients.

It is still another object of the present invention to easily switch whether or not a value common to a plurality of clients or values depending on clients are used for an arbitrary attribute of virtual space data.

It is still another object of the present invention to easily set authority to attribute data (e.g., to limit authority to refer to or change attribute data to only a specific client).

According to an aspect of the present invention, there is provided an information processing method comprising: a first acquisition step of acquiring an object level set for each computer graphics object in a virtual space; a second acquisition step of acquiring a rendering level in the virtual space; an attribute determination step of determining an attribute of the computer graphics object on the basis of the object level and rendering level; and a processing step of performing a process for the computer graphics object in accordance with the determined attribute of the computer graphics object.

According to another aspect of the present invention, there is provided an image processing method comprising: a first acquisition step of acquiring a first level set for each computer graphics object; a second acquisition step of acquiring a second level used to control rendering of the computer graphics object; and a control step of controlling rendering of the computer graphics object in accordance with the first and second levels.

According to a further aspect of the present invention, there is provided an image processing method comprising: a first acquisition step of acquiring a first level set for each node which forms a scene graph that represents a virtual space; a second acquisition step of acquiring a second level as a level used to control rendering of the scene graph; and a control step of controlling the attribute of the node in accordance with the first and second levels.

According to yet a further aspect of the present invention, there is provided an information processing method of allowing a plurality of processes to share data of an attribute used to define a virtual space, the attribute including an independent attribute which allows each of the plurality of processes to set an independent value, the method comprising: a step of generating a data of the attribute, which has data fields for the plurality of respective processes in association with data of the independent attribute; a step of transmitting, when each of the plurality of processes manipulates data in the database, information which can specify an objective to be manipulated and manipulation contents; and a step of manipulating data in the database in accordance with the objective to be manipulated and manipulation contents.

According to another aspect of the present invention, there is provided an information processing system which allows a plurality of information processing apparatus to share data of an attribute that defines a virtual object, the attribute including an independent attribute which allows each of the plurality of processes to set an independent value, the system comprising: generating unit adapted to generate a data of the attribute, which has data fields for the plurality of respective processes in association with data of the independent attribute; transmission unit adapted to, when data in the database is to be manipulated, transmit information which can specify an objective to be manipulated and manipulation contents; and manipulation unit adapted to manipulate data in the database in accordance with the objective to be manipulated and manipulation contents.

According to another aspect of the present invention, there is provided a program for making a computer execute an information processing method of the present invention or a computer readable recording medium storing such program.

Other objects and advantageous besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification; illustrate embodiments of the invention and, together with the description, serve to explain the principles of the invention.

FIG. 21 is a flowchart showing an example of a client process in the 10th embodiment;

FIG. 25 shows an example of the data configuration of event data;

FIG. 28 partially shows the data structure of a shared database in the 11th embodiment;

FIG. 31 partially shows the data structure of a shared database in the 12th embodiment;

DETAILED DESCRIPTION OF THE PREFERRED EMBODIMENTS

Figure 1:
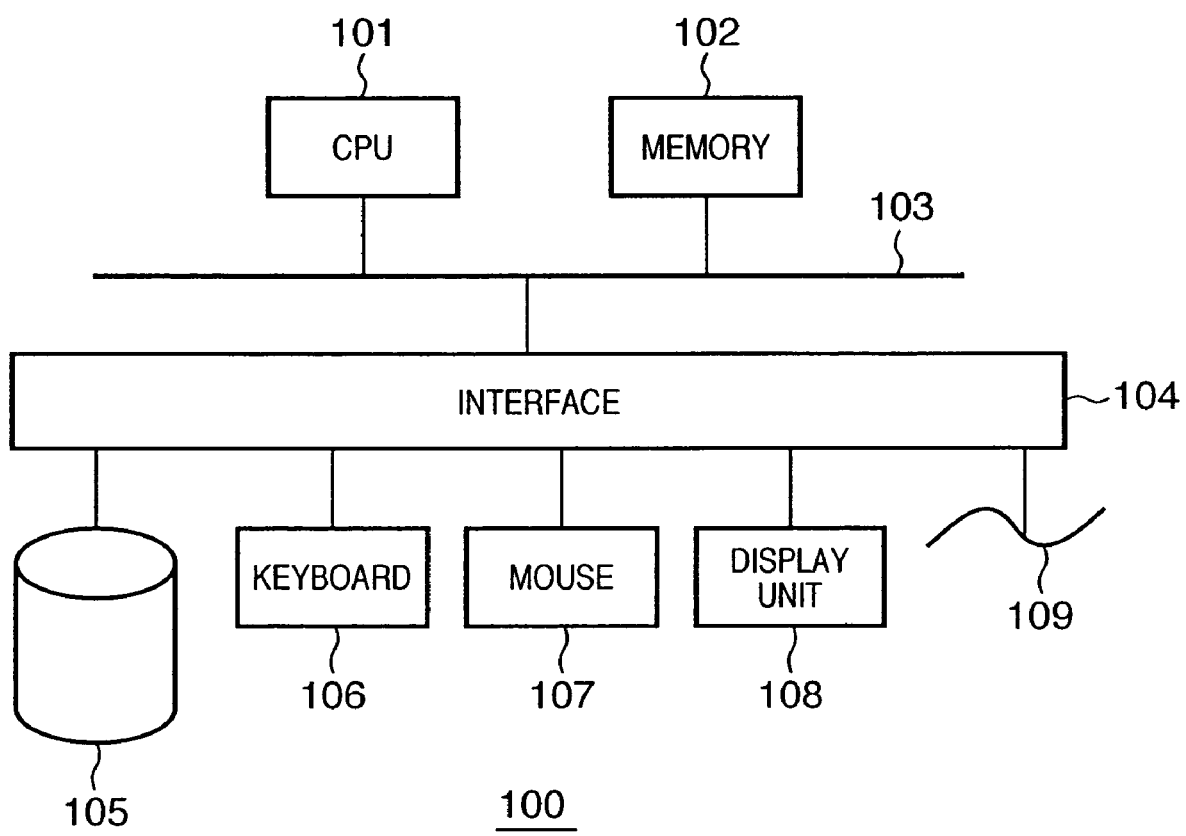
FIG. 1 is a block diagram showing an example of the arrangement of an information processing apparatus according to an embodiment of the present invention.

Preferred embodiments of the present invention will now be described in detail in accordance with the accompanying drawings.

In the following description, a minimum unit such as a component or the like which has an attribute and whose attribute setup can be controlled by a tool such as a 3DCAD, 3DCG tool, or the like which is used to design and render a virtual object using computer graphics technique will be referred to as a "CG object". Since a CG object represents a virtual object, it is often also called a virtual object. Furthermore, a setup value of an attribute is often described as "attribute value".

In the following description, a "process" is a unit used when a kernel of an OS (operating system) manages a program. One program is executed as one process or is executed while being divided into a plurality of processes. All processes of an information processing method of the present invention may be executed by one or a plurality of processes which form a program, or may be partially executed by a plurality of processes.

First Embodiment

In this embodiment, an attribute value called an "object level" of each CG object is compared with a level set for each application program, process, or user that use the CG object (to be referred to as a "user level" hereinafter), and the visible/invisible state of each CG object in an application program is determined based on that result.

Note that the setting timing and method of an object level and whether or not the user is allowed to set and change an object level can be appropriately determined in accordance with the purpose and contents of application programs that handle CG objects.

For example, in case of an application program that provides contents using CG objects to the user, a contents provider sets the object level, and does not allow the user to change it.

On the other hand, in case of an application program that allows the user to directly engage with generation of individual CG objects such as a 3DCAD or 3DCG design application program, the user can set the object level upon generation of each CG object.

The object level is stored in CG object data using an unused field of an attribute area in the known CG object data structure or by expanding the attribute area.

In this embodiment, the "user level" is a parameter which can be set for all subjects which control the visible/invisible states of CG objects. For example, when the user level is set as a parameter unique to each user who uses an application, if the application is used by a plurality of users, different environments can be provided for each user.

For example, in case of a game application, the application changes the user level in correspondence with the skill of each user, thus changing the difficulty of the game and items that the user can use.

Or if the user level is set as a parameter of an application program, a plurality of applications that use identical CG objects can realize different environments. For example, CG objects that a user can use can be changed in correspondence with the versions (for novice or skilled users) of the application programs.

If the user level is set as a parameter of a process executed in an application program, when a CG object is displayed on a plurality of windows by a plurality of window rendering processes, a CG object to be displayed can be changed for each window. For example, when projected images of a single CG object viewed from different viewpoints are to be simultaneously displayed, only a specific CG object can be set in a invisible state only on a projected image from a given viewpoint.

In any cases, the user level is stored in a memory or storage device as a parameter managed by an application program.

Note that a CG object in this embodiment has not only an object level but also an attribute called "visibility attribute" indicating a visible/invisible state. The object level and user level are expressed by floating-point values ranging from 0.0 to 1.0, and the visibility attribute is expressed by a binary value (1=visible; 0=invisible).

FIG. 1 shows an example of the hardware arrangement of an information processing apparatus of this embodiment. An information processing apparatus 100 has a CPU 101 which controls the operation of the overall apparatus by executing a program, a memory 102 which includes a ROM and RAM used to store programs and data to be executed by the CPU 101, a bus 103 that controls data transfer among building modules in the apparatus, an interface 104 between the bus 103 and various devices, an external storage device 105 that stores various programs (including application programs such as 3DCAD tool, 3DCG tool, and the like) executed by the CPU 101 and data, a keyboard 106 and mouse 107 as a user interface from which the user inputs instructions to the information processing apparatus 100, a display unit 108 that displays various kinds of information, and an input/output unit 109 such as a network interface, serial interface, or the like, which is used to directly or indirectly connect another apparatus. Such information processing apparatus can be implemented by a general-purpose computer which is generally available or can be assembled as a personal computer.

Figure 2:
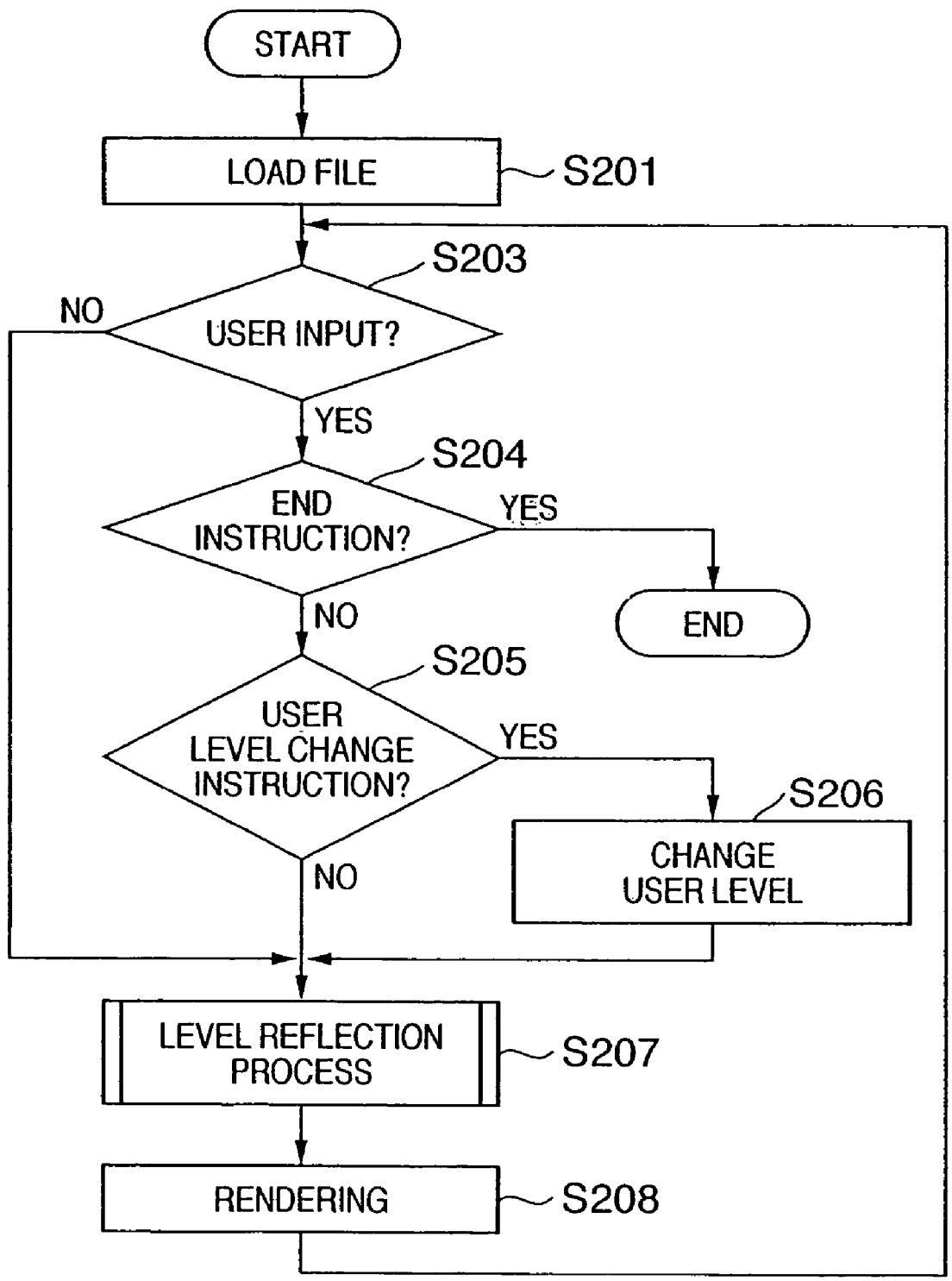
FIG. 2 is a flowchart showing the overall CG object rendering process of the information processing apparatus in the first embodiment.

FIG. 2 is a flowchart showing the overall CG object rendering process by the information processing apparatus 100. The process shown in FIG. 2 is executed in the application program executed by the information processing apparatus 100.

If the user instructs to launch an application program, that application program is read out from, e.g., the external storage device 105, and is executed.

In step S201, a file that describes attributes of a CG object handled by the application program is loaded from the external storage device 105, and an attribute database of the CG object is formed on the memory 102.

It is checked in step S203 if the user input is made via the keyboard 106 or mouse 107. If the user input is detected, the flow advances to step S204; otherwise, the flow jumps to step S207.

It is checked in step S204 if the user input is a program end instruction. If the user input is a program end instruction, the overall process ends. On the other hand, if the user input is not a program end instruction, the flow advances to step S205.

It is checked in step S205 if the user input is a user level change instruction. If the user input is a user level change instruction, the flow advances to step S206 to change the user level based on the user's instruction. The flow then advances to step S207. On the other hand, if the user input is not a user level change instruction, the flow advances to step S207.

In step S207, a level reflection process is executed. Details of the level reflection process will be described later.

After completion of step S207, the flow advances to step S208 to execute a rendering process. In this process, after image data used to save the rendering result is initialized, the process is made based on the visibility attributes of CG objects. More specifically, a projected image is generated for each CG object with the visibility attribute="1" (visible), and no projected image is generated for each CG object with the visibility attribute="0" (invisible). Note that a projected image of a CG object is generated using a known computer graphics technique.

Upon completion of the rendering process in step S208, the flow returns to step S203, and processes in steps S203 to S208 are repeated until the user inputs an end instruction.

<Level Reflection Process>

Figure 3:
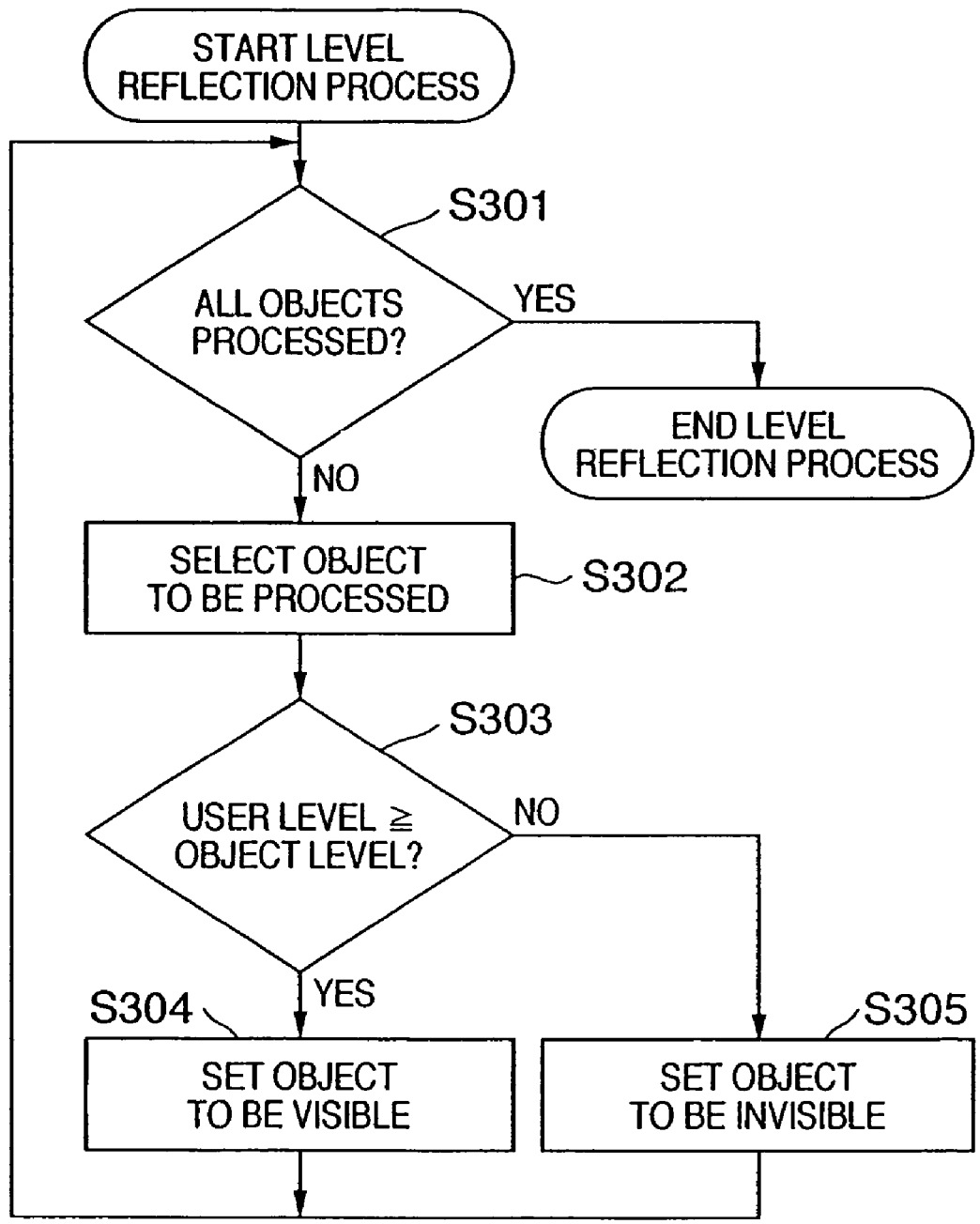
FIG. 3 is a flowchart showing details of a level reflection process in FIG. 2.

The level reflection process executed in step S207 in FIG. 2 will be described below using the flowchart shown in FIG. 3.

It is checked in step S301 if the level reflection process is complete for all CG objects to be handled by the currently running application. If the process is complete for all CG objects, the level reflection process ends. On the other hand, if CG objects to be processed still remain, the flow advances to step S302 to select one of CG objects to be processed.

Whether or not each CG object is processed can be determined by setting a processed/non-processed attribute as an attribute of each CG object, and checking that value, or generating a list of CG objects included in a project, and deleting processed one in turn from the list. That is, arbitrary methods may be used.

In step S303, the user level set in the application program is compared with the object level of the selected CG object. If the user level is equal to or higher than the object level, the flow advances to step S304. If the user level is lower than the object level, the flow advances to step S305.

In step S304, the visibility attribute of that object is set to be "visible". On the other hand, in step S305 the visibility attribute is set to be "invisible state".

Upon completion of step S304 or S305, the flow returns to step S301.

<Change User Level>

Figure 4:
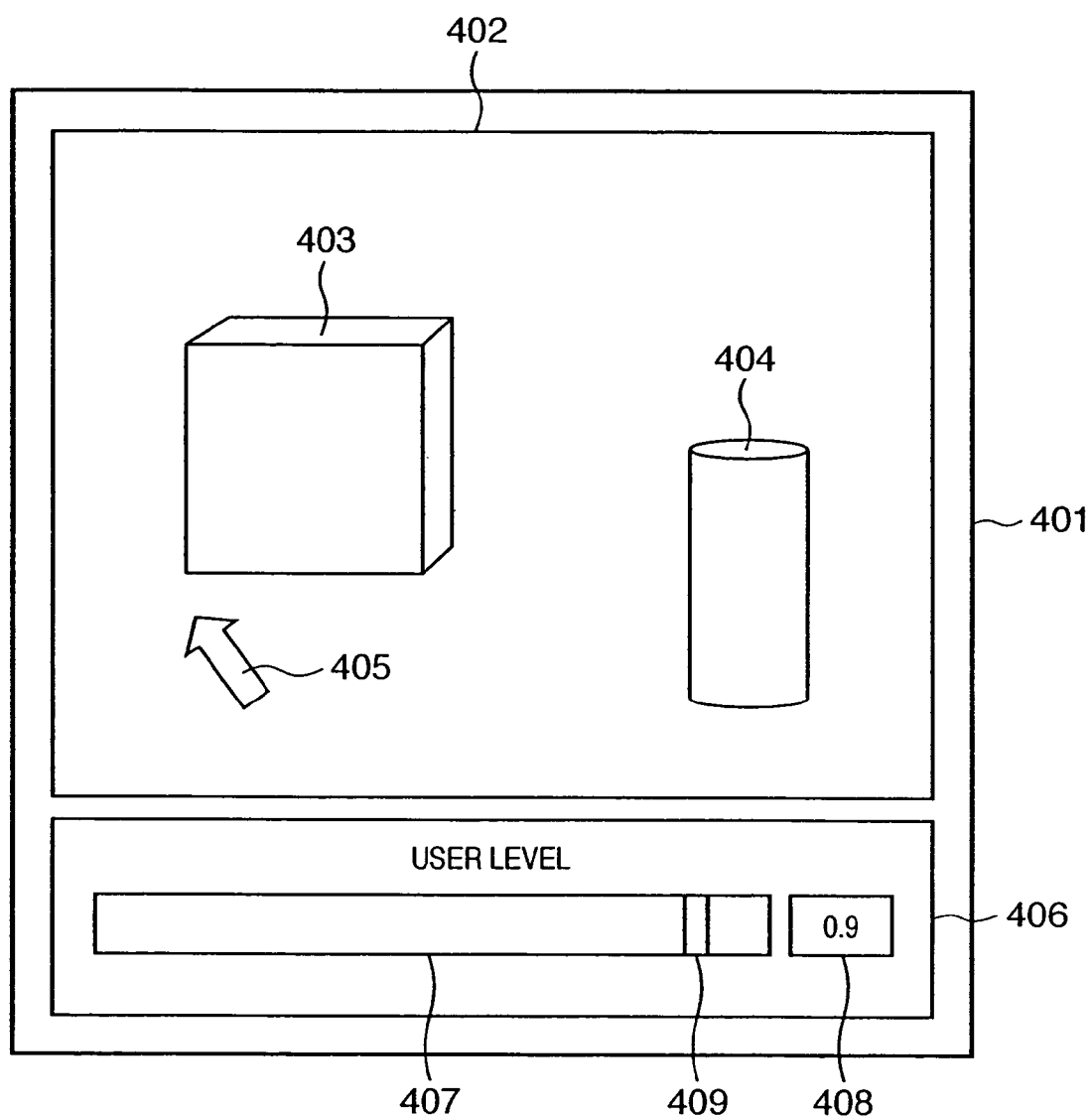
FIG. 4 shows a display example of a user level change window in the first embodiment.

FIG. 4 shows a display example of a user level setting window in the information processing apparatus 100 of this embodiment. The window shown in FIG. 4 is generated by a rendering process in step S208 (FIG. 2). The generated image is written in a frame buffer area of the memory 102 (FIG. 1), and image information in the frame buffer is output to the display unit 108.

Assume that there are two CG objects handled by an application program, i.e., a rectangular solid and a cylinder, the object level of the rectangular solid object is set to be 0.3, and that of the cylinder object is set to be 0.7.

A display window 401 includes a three-dimensional (3D) display area 402 for displaying projected images of CG objects, and a user level setting area 406 for setting the user level. Also, reference numeral 405 denotes a cursor which can be operated by the user using the keyboard 106 or mouse 107.

The user level setting area 406 includes a user level valuator 407 and user level indicator 408. In order to change the user level, the user moves the cursor 405 onto a slide bar 409 of the user level valuator 407, and moves the cursor 405 to the right or left while holding down a button of the mouse 107 (i.e., drags the slide bar 409 to the right or left). At this time, the slide bar 409 moves upon movement of the cursor 405. By moving the slide bar 409, a user level change instruction is generated.

Note that the user level is determined by the position of the slide bar 409 on the valuator 407, and the current setting value is displayed by the user level indicator 408. In the example of FIG. 4, the user level is set to be 0.9. The user can interactively change the user level by operating the GUI.

In the example of FIG. 4, since the setting value (0.9) of the user level is higher than the object levels (0.3 and 0.7) of the rectangular solid and cylinder objects, the visibility attributes of the two CG objects are set to be 1 (display state). For this reason, the rendering process in step S208 displays projected images 403 and 404 of the rectangular solid and cylinder objects on the 3D space display area 402.

Figure 5:
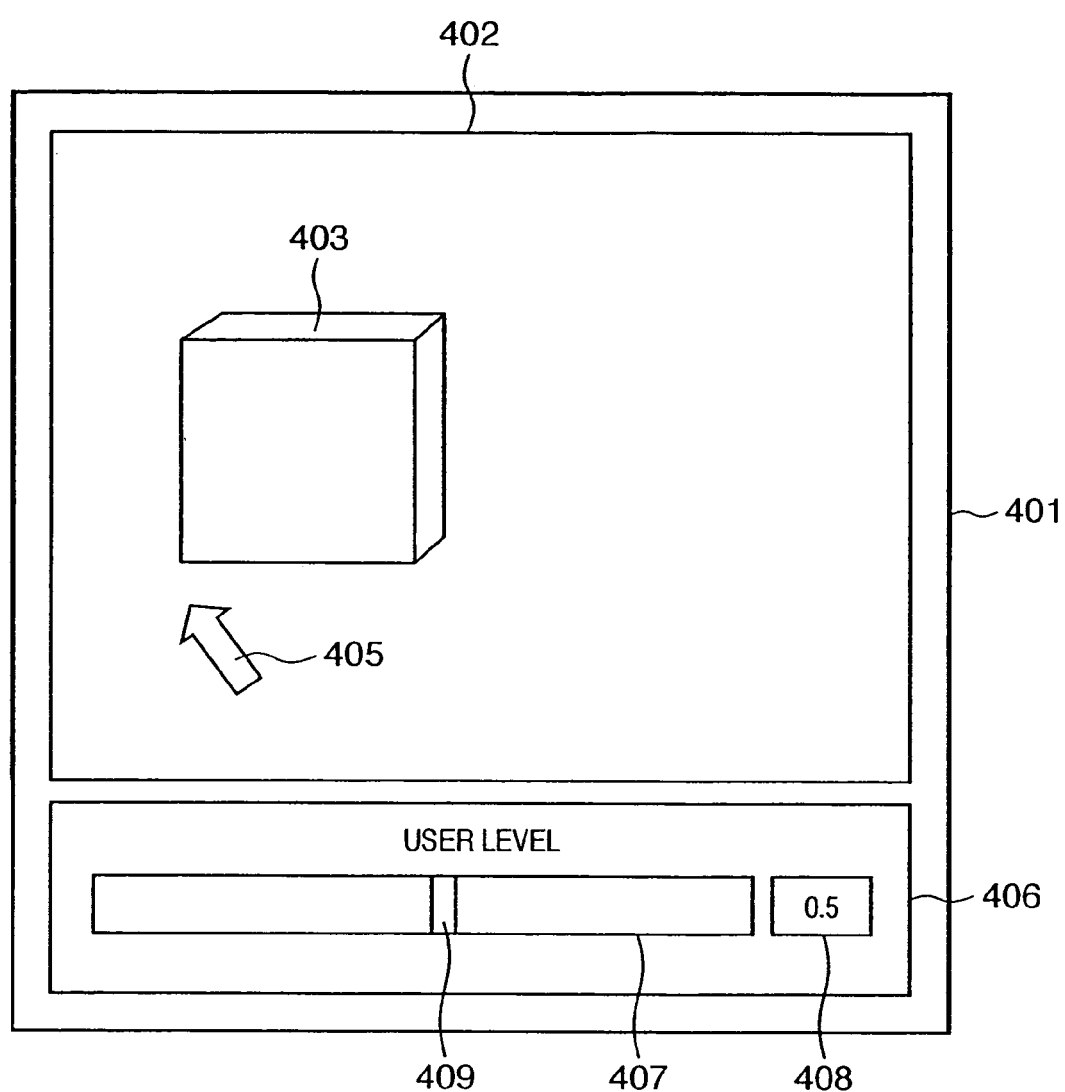
FIG. 5 shows an example of a state wherein the user level has changed in FIG. 4.

FIG. 5 shows a state wherein the user has moved the slide bar 409 from the state in FIG. 4 to the left to change the user level to 0.5. At this time, the user level is equal to or higher than the object level (0.3) of the rectangular solid object, and is lower than that (0.7) of the cylinder object. Therefore, as has been explained in steps S303 to S305 in FIG. 3, the visibility attribute of the rectangular solid object is set to be 1 (display state), and that of the cylinder object is set to be 0 (invisible state). As a result, a projected image of only the rectangular solid object of the two objects is displayed on the 3D space display area.

The user level change instruction input window and user operation method have been explained using FIGS. 4 and 5. As a method of inputting an instruction other than a user level change instruction, a method of selecting an instruction from a pull-down menu or a button on the window, or a method of a specific key input (a combination of a plurality of keys, depression of an ESC key, or the like) may be used.

Note that FIGS. 4 and 5 have explained a case wherein the application handles two CG objects, for the sake of simplicity. However, the number of CG objects is not limited to two.

Figure 6:
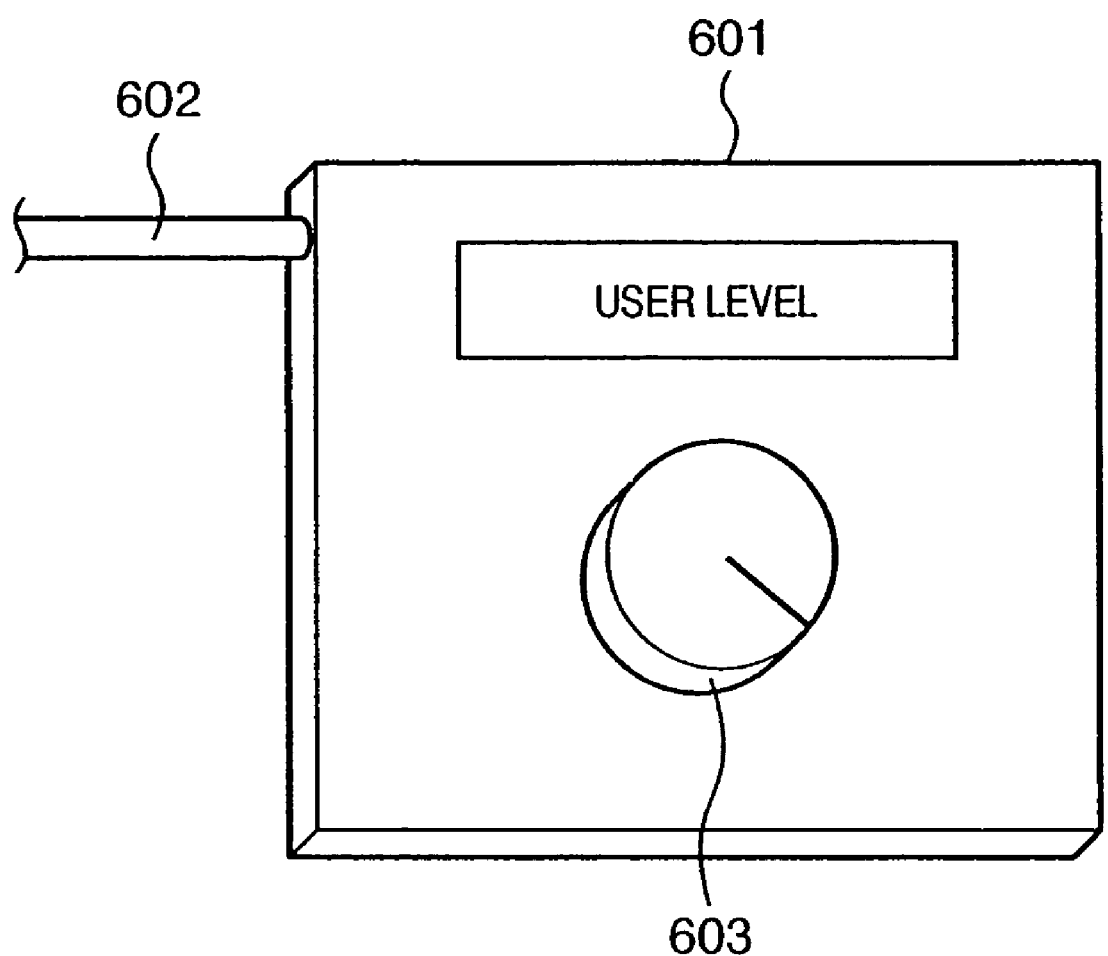
FIG. 6 shows a hardware implementation example of a level adjustment unit in FIG. 4.

Note that this embodiment has explained an example wherein the user level can be set via the GUI (Graphical User Interface). However, other methods may be used. For example, hardware that can communicate with the information processing apparatus 100 may be used. For example, a user level adjuster 601 which has a volume 603 as a user level valuator may be provided, as shown in FIG. 6, and may be connected to the input/output unit 109 via a cable 602 when it is used. The user level adjuster 601 may be connected to the information processing apparatus 100 via a wireless network such as Bluetooth or the like.

When the user turns the volume 603 clockwise or counter-clockwise, a value according to the rotation angle is output to the information processing apparatus 100, which converts the input value into a value within the available user level range, thus changing the user level. Note that the interactive user level setting process is preferably allowed by displaying the user level value together with projected images of CG objects as in the setting process by means of the GUI that has been explained using FIG. 4.

When the user level is set or adjusted using the dedicated hardware, as shown in FIG. 6, various other instructions including a program end process may still be input using the GUI, or hardware (e.g., a button) used to input a specific instruction such as a program end instruction may be provided to the user level adjuster 601 in FIG. 6.

In this embodiment, the user can set or change only the user level. Alternatively, the application itself may change the user level. For example, lower object levels may be set for CG objects with higher importance levels, and the user level may be changed in inverse proportion to the processing load of the information processing apparatus. As a result, CG objects which are not so important turn to an invisible state as the processing load becomes heavier (i.e., the user level lowers), thus reducing the processing load required to render CG objects.

In FIGS. 4 and 5, the user level setting area 406 is always displayed. However, the user level setting area 406 may be displayed only when a user's request is received.

As described above, according to the information processing apparatus of this embodiment, by changing only one value, i.e., the user level, attributes of all CG objects can be set or changed simultaneously, thereby reducing the number of steps required to set and change attributes.

Second Embodiment

In the first embodiment, the visibility attributes of CG objects are set on the basis of comparison results between the object levels and user level. However, other attributes of CG objects may be set, and methods other than comparison may be used. That is, the types of attributes to be calculated and attribute calculation algorithms are not particularly limited as long as attributes can be logically determined using the object and user levels.

The information processing apparatus according to this embodiment determines the attributes of CG objects on the basis of the ratio between the object and user levels.

In this embodiment, each CG object has opacity as an attribute in addition to the object level. Since the arrangement of the information processing apparatus of this embodiment can be the same as that in the first embodiment, a description thereof will be omitted. In this embodiment, the object level and user level are expressed by floating-point values ranging from 0.0 to 1.0, and the opacity has predetermined minimum and maximum values, and is expressed by a floating-point value ranging from the minimum value to the maximum value.

In this embodiment, since processes different from those of the first embodiment are only the level reflection process (step S208 in FIG. 2) and the rendering process (S209 in FIG. 2), processes to be executed in these steps will be explained below.

<Level Reflection Process>

Figure 7:
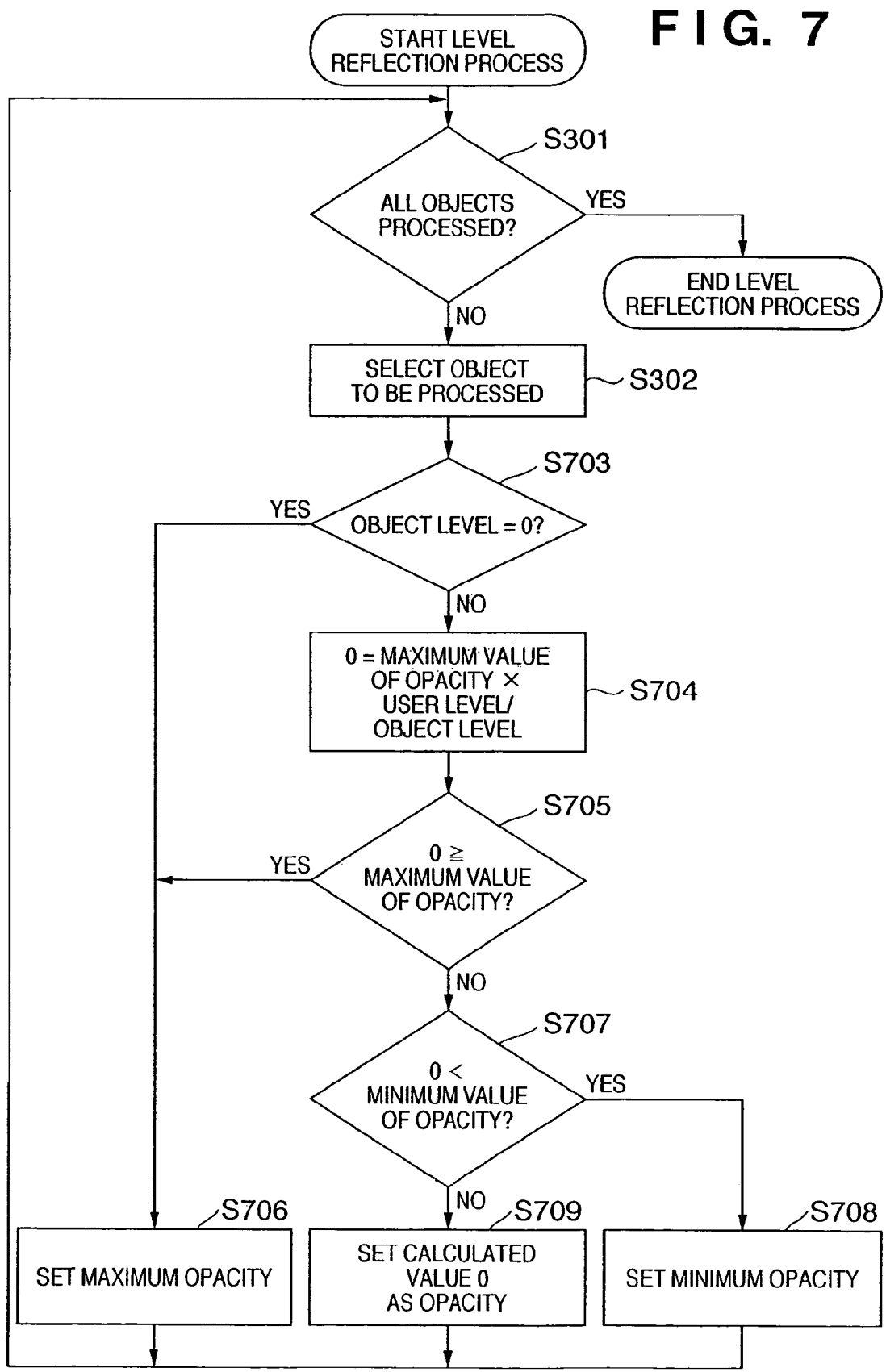
FIG. 7 is a flowchart showing details of a level reflection process in the second embodiment.

FIG. 7 is a flowchart showing the level reflection process in this embodiment.

In steps S301 and S302, the same processes as those in the level determination process in the first embodiment are executed.

It is checked in step S703 if the object level of a CG object to be processed selected in step S302 is zero. This step prevents step S704 from making division by zero. If the object level is zero, the flow advances to step S706. On the other hand, if the object level is not zero, the flow advances to step S704.

In step S704, opacity O to be set for the selected CG object is calculated. In this embodiment, the opacity O is calculated by multiplying the ratio of the user level to the object level by a predetermined maximum value of the opacity. More specifically, O=maximum value of opacity×user level/object level.

In step S705, O calculated in step S704 is compared with the predetermined maximum value of the opacity. If the calculated opacity O is equal to or larger than the maximum value, the flow advances to step S706 to set the maximum value as the opacity of the CG object. After that, the flow returns to step S301.

On the other hand, if the calculated opacity O is smaller than the maximum value, the flow advances to step S707. In step S707, the calculated opacity O is compared with a predetermined minimum value of the opacity. If O is smaller than the minimum value, the minimum value is set as the opacity of the CG object in step S708, and the flow returns to step S301.

On the other hand, if the opacity is equal to or larger than the minimum value, the flow advances to step S709 to set the calculated opacity O as the opacity attribute value of the object. The flow then returns to step S301.

<Rendering Process>

In the rendering process (the process to be executed in step S209 in FIG. 2) of this embodiment, after image data that saves a rendering result is initialized, projected images of CG objects are generated based on their opacity values. Since a CG rendering method of translucent and opaque objects can use the method which is known in the field of computer graphics, a detailed description thereof will be omitted.

In this embodiment, the setting and changing methods of the object and user levels are the same as those in the first embodiment. The user level may be adjusted using a GUI on the display window shown in FIG. 4 or using the user level adjuster 601 shown in FIG. 6.

As described in the first embodiment, the user may interactively set or change the user level. Also, the application program itself may change the user level irrespective of user's input.

This embodiment has been explained as an example of changing the attribute of a CG object other than a visibility attribute on the basis of a result other than a comparison result between the object and user levels. Again, the types of attributes to be calculated and attribute calculation algorithms are not. particularly limited as long as attributes can be logically determined using the object and user levels.

As described above, according to the information processing apparatus of this embodiment, the attributes of all CG objects can be simultaneously set or changed by changing only one value, i.e., the user level, thus reducing the number of steps required to set and change the attributes.

Third Embodiment

In the first and second embodiments, the object level uses a value described in advance in a file, and only the user level is changed interactively or by the application itself. By contrast, an information processing apparatus of this embodiment also allows to change the object level. Note that this embodiment will exemplify a case wherein the visibility attribute of each object is determined on the basis of the object and user levels as in the first embodiment.

Since the arrangement of the information processing apparatus of this embodiment can be the same as that in the first embodiment, a description thereof will be omitted.

Figure 8:
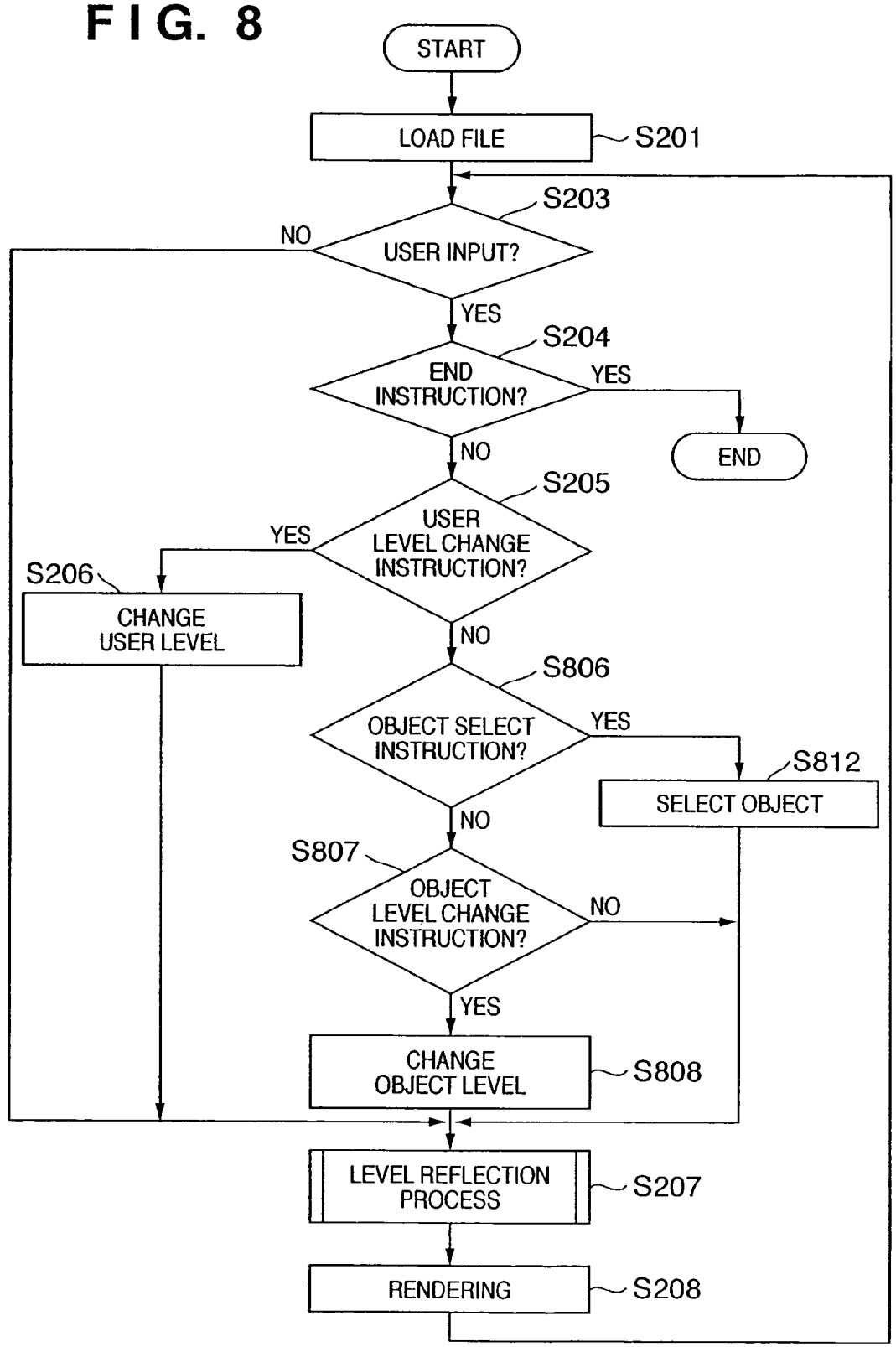
FIG. 8 is a flowchart showing the overall CG object rendering process of an information processing apparatus in the third embodiment.

FIG. 8 is a flowchart showing the overall CG object rendering process of the information processing apparatus 100 in this embodiment. The process shown in FIG. 8 is executed in the application program executed by the information processing apparatus 100.

In the processes shown in FIG. 8, since those for determining the presence/absence of the user input, and ending the process or changing the user level (steps S201 to S206) are the same as those in the first embodiment described using FIG. 2, processes in step S806 and subsequent steps will be explained.

It is checked in step S806 if the user input is an instruction that selects an object, the object level of which is to be changed. If the user input is an object select instruction, the flow advances to step S812 to register a CG object designated by the user as an object whose object level is to be changed. The flow then advances to step S207. On the other hand, if the user input is not an object select instruction, the flow advances to step S807. Registration of a CG object, the object level of which is to be changed, can be implemented by arbitrary methods, e.g., by extracting the ID of a target CG object onto the memory 102, or assuring a level change target flag as one of attributes of a target CG object and changing that value.

It is checked in step S807 if the user input is an object level change instruction. If the user input is an object level change instruction, the flow advances to step S808. In step S808, the object level of the CG object, which is registered as an object, the object level of which is to be changed, is changed on the basis of the user instruction, and the flow advances to step S207. On the other hand, if it is determined in step S807 that the user input is not an object level change instruction, the flow jumps to step S207.

The level reflection process is executed in step S307, and the rendering process is executed in step S208. Since these processes are the same as those (FIG. 3) in the first embodiment, a description thereof will be omitted.

Upon completion of the rendering process in step S208, the flow returns to step S203 to repeat the aforementioned processes until the user inputs an end instruction.

<Change Object Level & User Level>

Figure 9:
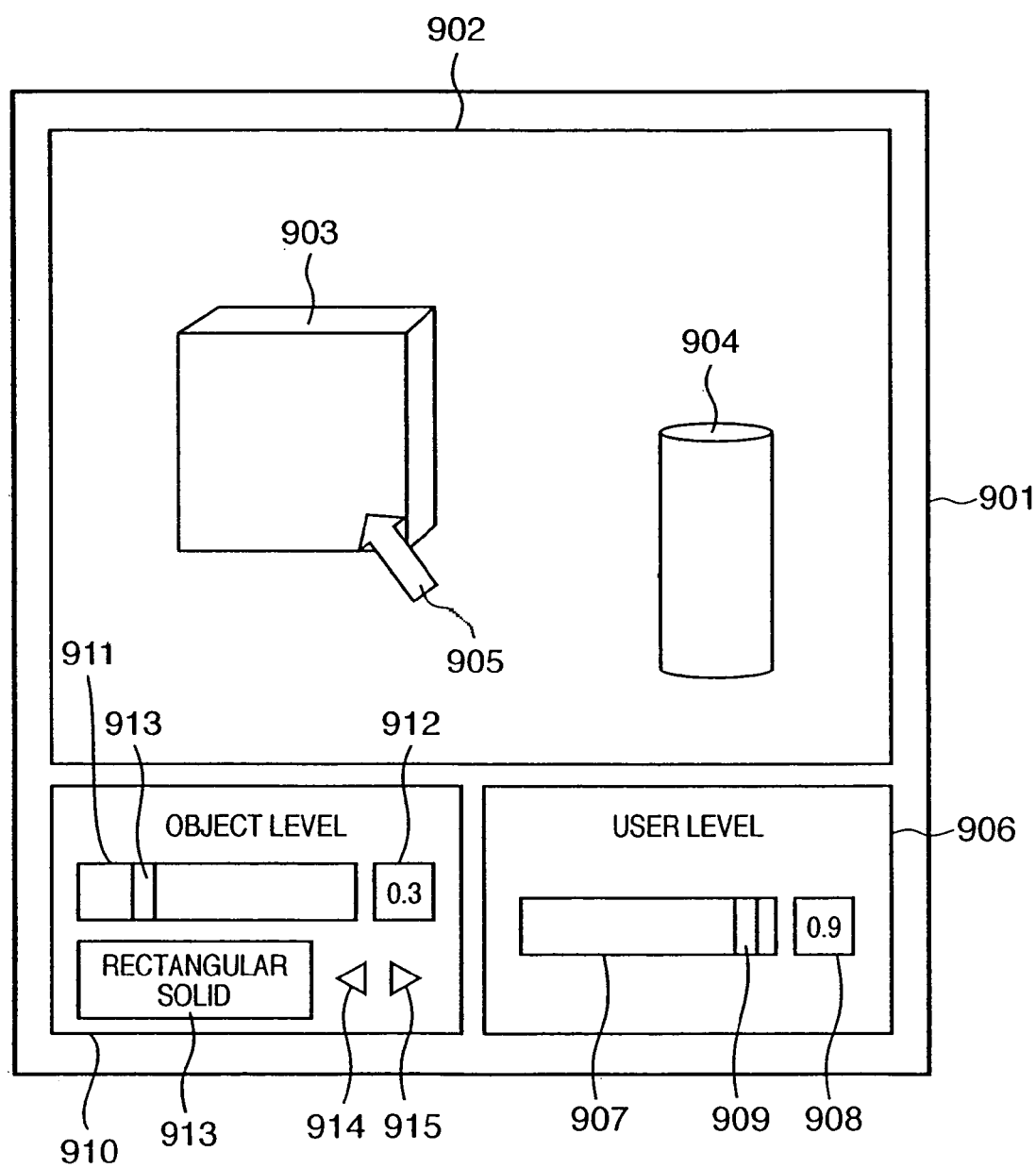
FIG. 9 shows a display example of a level change window in the third embodiment.

FIG. 9 shows a display example of an object level & user level setting-window of the information processing apparatus 100 of this embodiment. The window shown in FIG. 9 is generated by, e.g., the rendering process in step S208. The generated image is written in a frame buffer area of the memory 102, and image information in the frame buffer is output to the display unit 108.

Assume that there are two CG objects handled by an application program, i.e., a rectangular solid and cylinder, the object level of the rectangular solid object is set to be 0.3, and that of the cylinder object is set to be 0.7.

A display window 901 includes a 3D display area 902 for displaying projected images of CG objects, a user level setting area 906 for setting the user level, and an object level setting area 910 for setting the object level. Also, reference numeral 905 denotes a cursor which can be operated by the user using the keyboard 106 or mouse 107. The user level setting area 906 has the same configuration as that of the user level setting area 406 in FIG. 4. Hence, the user level setting process using the user level setting area 906 is the same as that using the user level setting area 406 in FIG. 4, a description thereof will be omitted.

In order to set or change the object level, an object to be set must be selected. The object is selected using an object select button 914 or 915 provided to the object level setting area 910. When the user presses the button of the mouse 107 (FIG. 1) while adjusting the cursor 905 to the button 915, the CG objects are selected one by one in an order they are stored in the memory 102. On the other hand, upon operation of the button 914, CG objects are selected in the reverse order.

If a CG object is selected upon operation of the button 915 or 914, an object select instruction is issued to the information processing apparatus 100. A character string used to identify an object is displayed on the selected object display area 913 so as to allow the user to correctly recognize the selected CG object. In the display example in FIG. 9, a rectangular solid object 903 is selected, and the name (in this case, "rectangular solid") of the CG object 903 set by a file or the like read in step S201 is displayed.

The object level setting area 910 also has an object level valuator 911 and object level indicator 912. In order to change the object level of the selected CG object, the user moves the cursor 905 onto a slide bar 913 on the object level valuator 911, and moves the cursor to the right or left while holding down the button of the mouse (107 in FIG. 1) (i.e., drags the slide bar 913 to the right or left). At this time, the slide bar moves upon movement of the cursor. By operating the object level valuator, an object level change instruction is generated.

Note that the object level is determined by the position of the slide bar 913 on the valuator 911, and the current setting value is displayed on the object level indicator 912. In the example of FIG. 9, the object level is set to be 0.3. The user can interactively change the object level of the selected CG object by operating the GUI.

As in the first embodiment, as a method of inputting an instruction other than a user level change instruction, a method of selecting an instruction from a pull-down menu or a button on the window, or a method of a specific key input (a combination of a plurality of keys, depression of an ESC key, or the like) may be used.

Note that FIG. 9 has explained a case wherein the application that handles two CG objects is executed, for the sake of simplicity. However, the number of CG objects is not limited to two.

Furthermore, the object level and user level may be set using hardware that can communicate with the information processing apparatus 100, as has been explained in the first embodiment.

Figure 10:
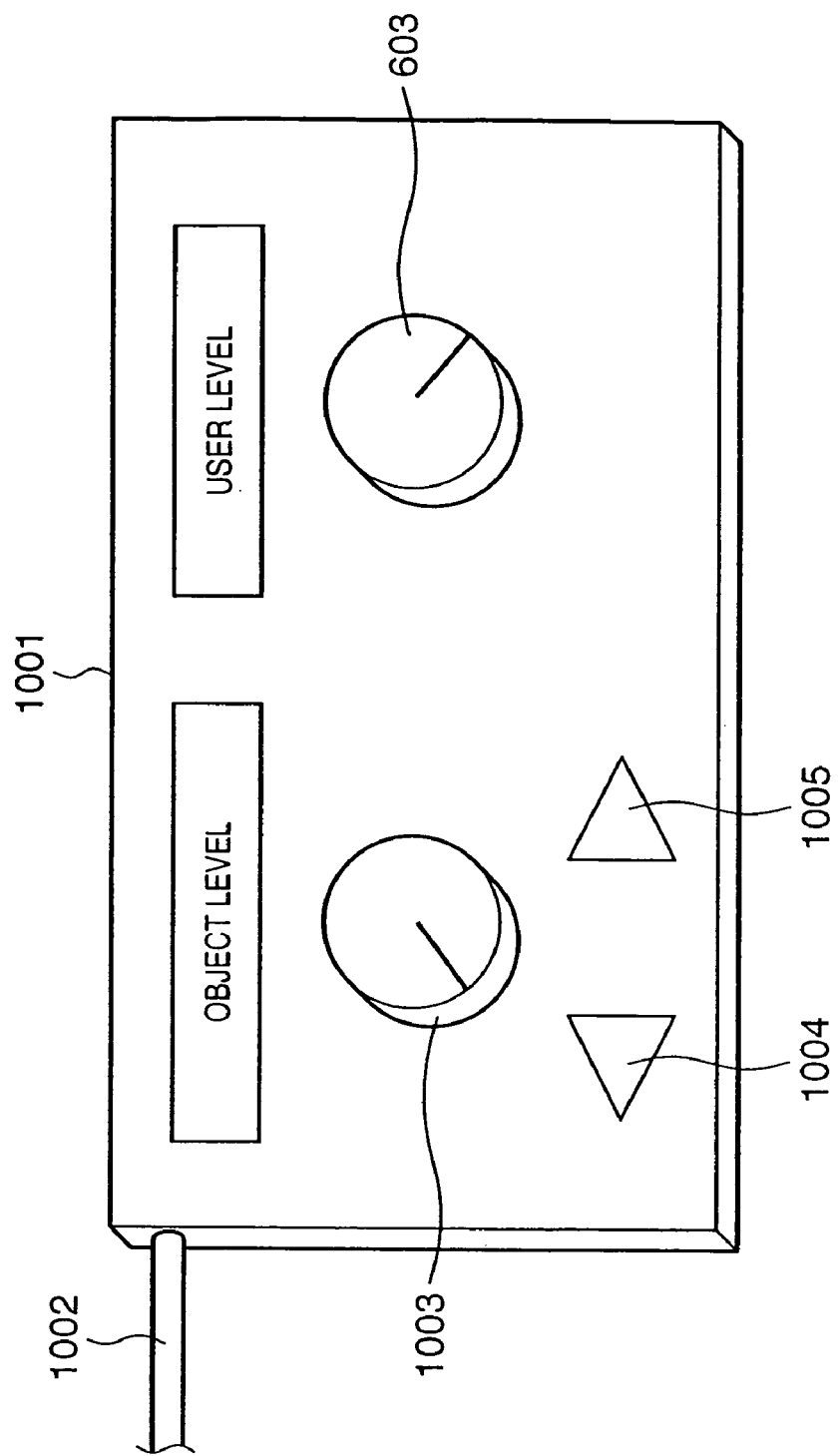
FIG. 10 shows a hardware implementation example of a level adjustment unit in FIG. 9.

For example, as shown in FIG. 10, an object level adjustment function can be added to the user level adjuster 601 shown in FIG. 6. The right side of an adjuster 1001 in FIG. 10 corresponds to the user level adjuster 601 in FIG. 6. An object level adjustment volume 1003, and object select buttons 1004 and 1005 are provided on the left side.

An object is selected using the object select button 1004 or 1005. The functions of the buttons 1004 and 1005 are the same as those of the buttons 914 and 915 in FIG. 9. When the object level adjustment volume 1003 is turned clockwise/counterclockwise, the object level changes in the same manner as movement of the slider bar 913.

The user level & object level setting information is input from the adjuster 1001 to the information processing apparatus 100 of this embodiment via a connection cable 1002 and the input/output unit 109. Note that the user and object level setting values are displayed together with the projected images of CG objects to allow interactive user level setting processes as in the setting process using the GUI that has been explained using FIGS. 4 and 9.

When the object level and user level are set or adjusted using dedicated hardware shown in FIG. 10, various other instructions including a program end process may still be input using the GUI, or hardware (e.g., a button) used to input a specific instruction such as a program end instruction may be provided to the adjuster 1001 in FIG. 10.

Figure 11:
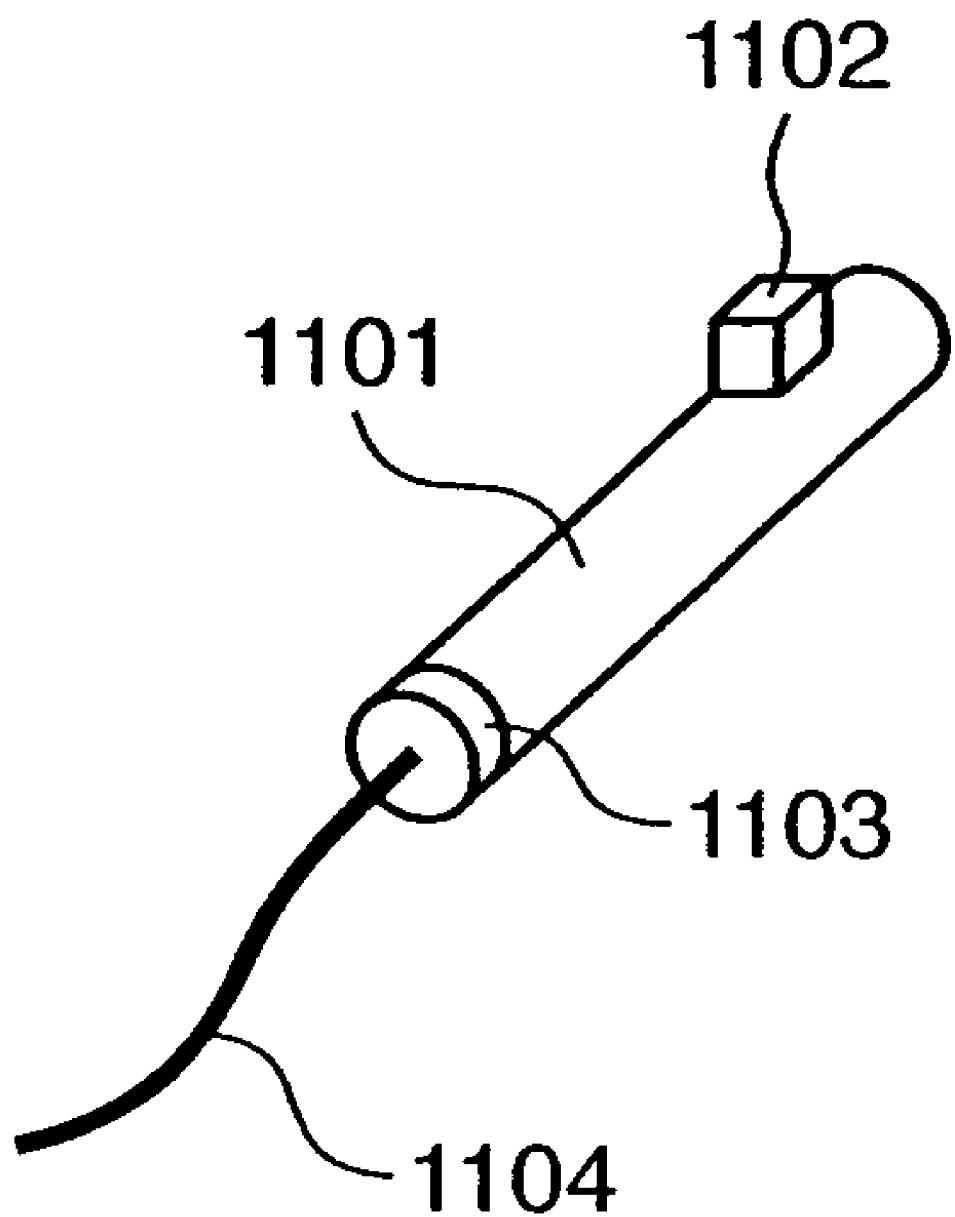
FIG. 11 shows an example of a stylus device that can be used as an object level adjustment unit.

As another method of setting the object level, a stylus device 1101 shown in FIG. 11 may be used. The stylus device 1101 incorporates a sensor (not shown) that detects its position and orientation, and comprises a button 1102 and dial 1103. The stylus device 1101 is connected to the input/output unit 109 of the information processing apparatus 100 via a data transmission cable 1104. The CPU 101 controls the stylus device 1101 via the input/output unit 109 and data transmission cable 1104 to read out the position and orientation data of the stylus device 1101, the depression state of the button 1102, and the rotational position information of the dial 1103.

Figure 12:
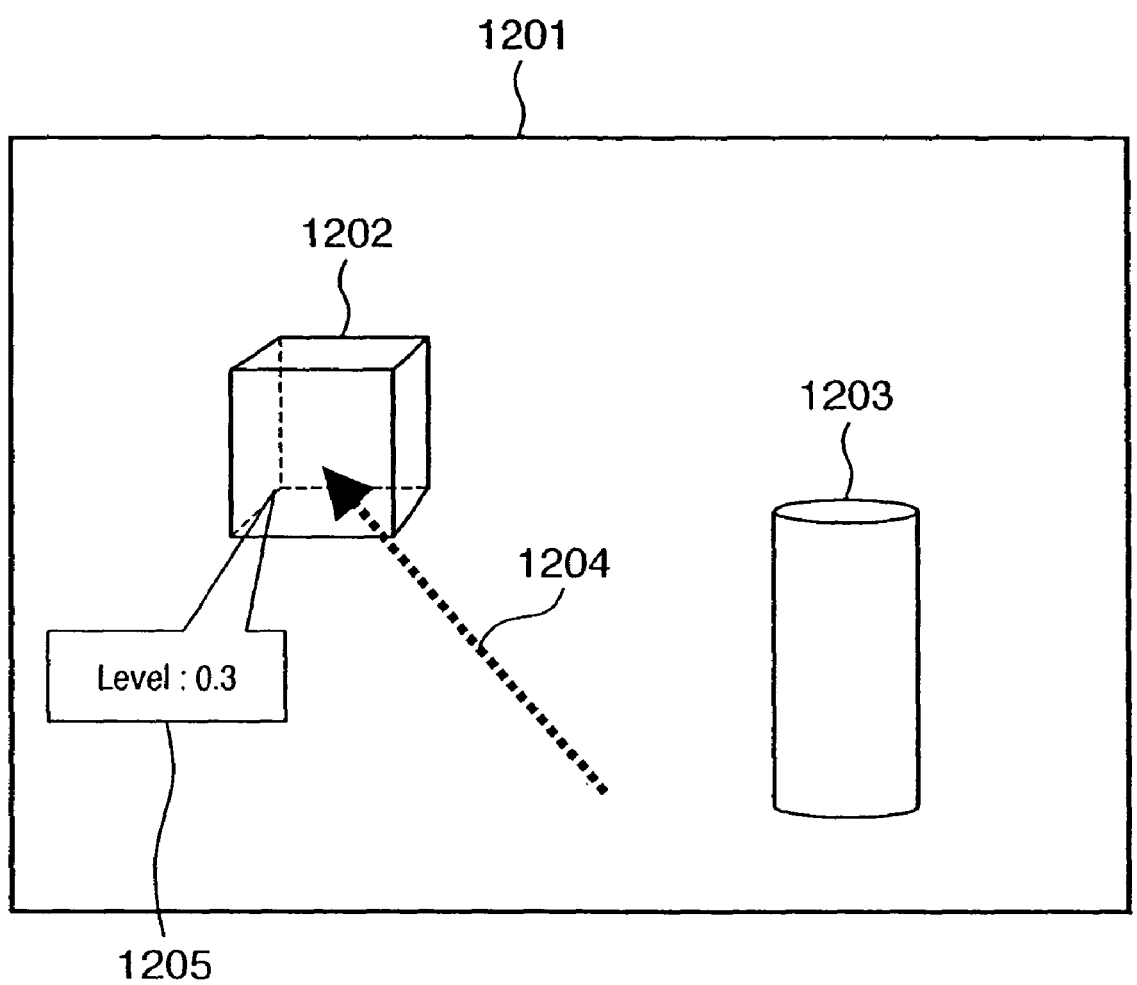
FIG. 12 shows a display example of a level change window when the stylus device shown in FIG. 11 is used.

FIG. 12 shows a window display example when the object level is set using the stylus device 1101. In FIG. 12, a 3D display window 1201 displays projected images of two CG objects 1202 and 1203. Also, the 3D display window 1201 displays a pointer 1204 which is calculated based on the position and orientation data read out from the sensor incorporated in the stylus device 1101 and represents a straight line on the 3D space.

When the user operates the stylus device 1101 and turns the pointer 1204 and presses the button 1102 toward an object image (the projected image 1202 of the rectangular solid in this display example), the object level of which is to be changed, the designated CG object is selected. At this time, the selected object is highlighted, and its object level value is displayed (object level indication 1205).

When the dial 1103 of the stylus device 1101 is turned, a value displayed on the object level indication 1205 increases/decreases in accordance with the direction and amount of rotation, the object level of the selected object is set to be a value displayed on the indication 1205.

As has been explained in the above embodiments, not only the user interactively sets the object level, but also the application program itself may set or change the object level. For example, in case of a game program, when the object level is set to be lower as the game progresses, the number of obstacle objects to be displayed on the virtual space increases in accordance with improvement of user's skills, thus increasing the difficulty of the game.

As described above, according to the information processing apparatus of this embodiment, not only the user level but also the object level of each object can be changed. In this way, the number of steps required to change attributes can be reduced, but also the attributes of objects can be flexibly controlled.

Fourth Embodiment

In the first to third embodiments, the setting processes of the user level and object level, and the determination process of attributes that reflect the user and object levels are limited to the range of one program (or one process). By contrast, a configuration in which a plurality of programs (or processes) determine attributes of objects on the basis of a common level can be implemented.

In this embodiment, a plurality of programs share a database including object level data, and the user level is independently set by each individual program.

Figure 13:
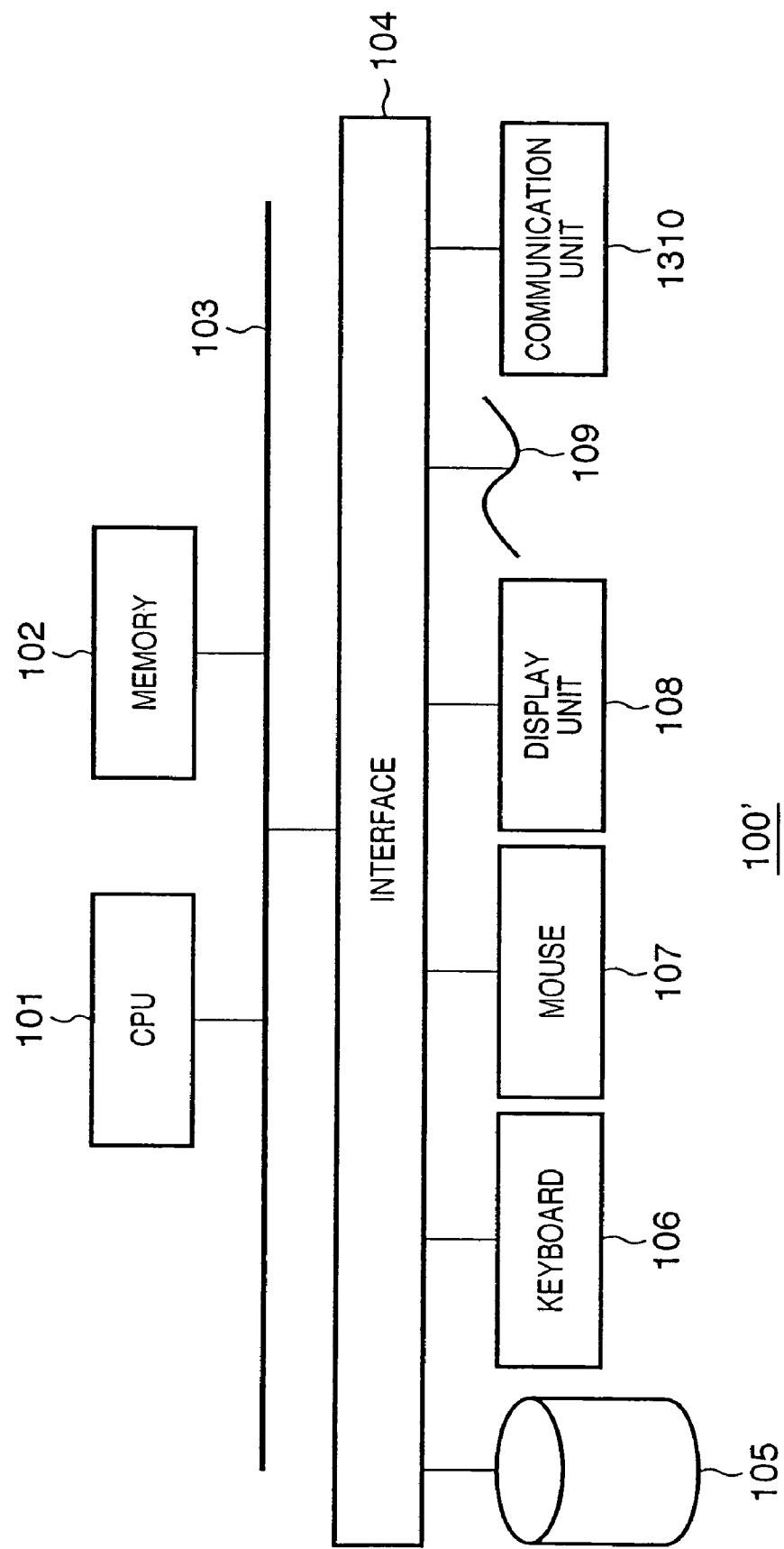
FIG. 13 is a block diagram showing an example of the arrangement of an information processing apparatus according to the fourth embodiment.

FIG. 13 shows an example of the arrangement of an information processing apparatus 100' according to this embodiment. This arrangement comprises a communication unit 1310 used to connect a network in addition to the arrangement of the information processing apparatus 100 shown in FIG. 1. The communication unit may comprise a network interface or a combination of a serial interface and modem.

Figure 14:
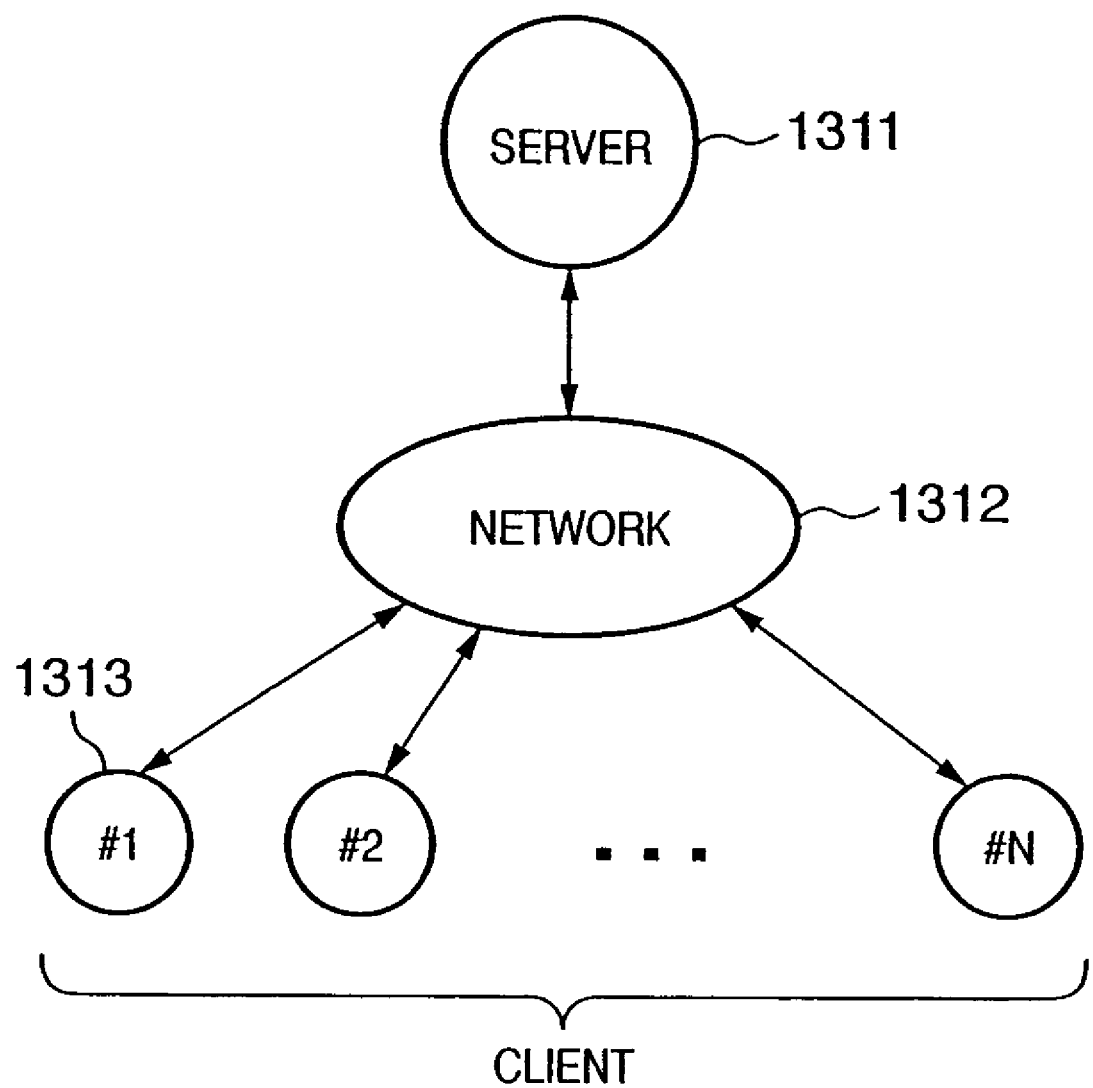
FIG. 14 is a diagram showing an example of the arrangement of the entire database sharing system in the fourth embodiment.

FIG. 14 shows an example of the configuration of a database sharing system formed by the information processing apparatus 100' of this embodiment. This system includes one server process 1311 (to be abbreviated as "server" hereinafter), and a plurality of client processes 1313 (to be abbreviated as "clients" hereinafter), which exchange data via a network 1312. Each client holds a common database. In this embodiment, the network 1312 is a LAN built on Ethernet®. However, the network may adopt other formats.

For the sake of easy description and understanding of this embodiment, the server process 1311 and the plurality of client processes 1313 respectively run on independent information processing apparatuses 100'.

The term "database manipulation" used in the following description will be explained. A "manipulation" of a database indicates a procedure for rewriting the contents of a database in an arbitrary process having a shared database. The database manipulation is classified into two processes, i.e., "manipulation instruction" and "manipulation execution". The manipulation instruction is an update request of the database, and does not actually rewrite the contents. The actual rewrite process of the database is executed in the manipulation execution process. Hence, "manipulation" will indicate "database manipulation" herein unless otherwise specified. If a manipulation objective is other than a shared database, the manipulation objective is specified like "interactive device manipulation by the user".

Note that the manipulation instruction may be generated by the user or by a process during an operation. As an example of the former kind, the user may change the object level by manipulating an interactive device such as the mouse or the like on the operation window shown in FIG. 9. On the other hand, as an example of the latter kind, the game program in a game system may change the object level by itself as part of its process.

Figure 15:
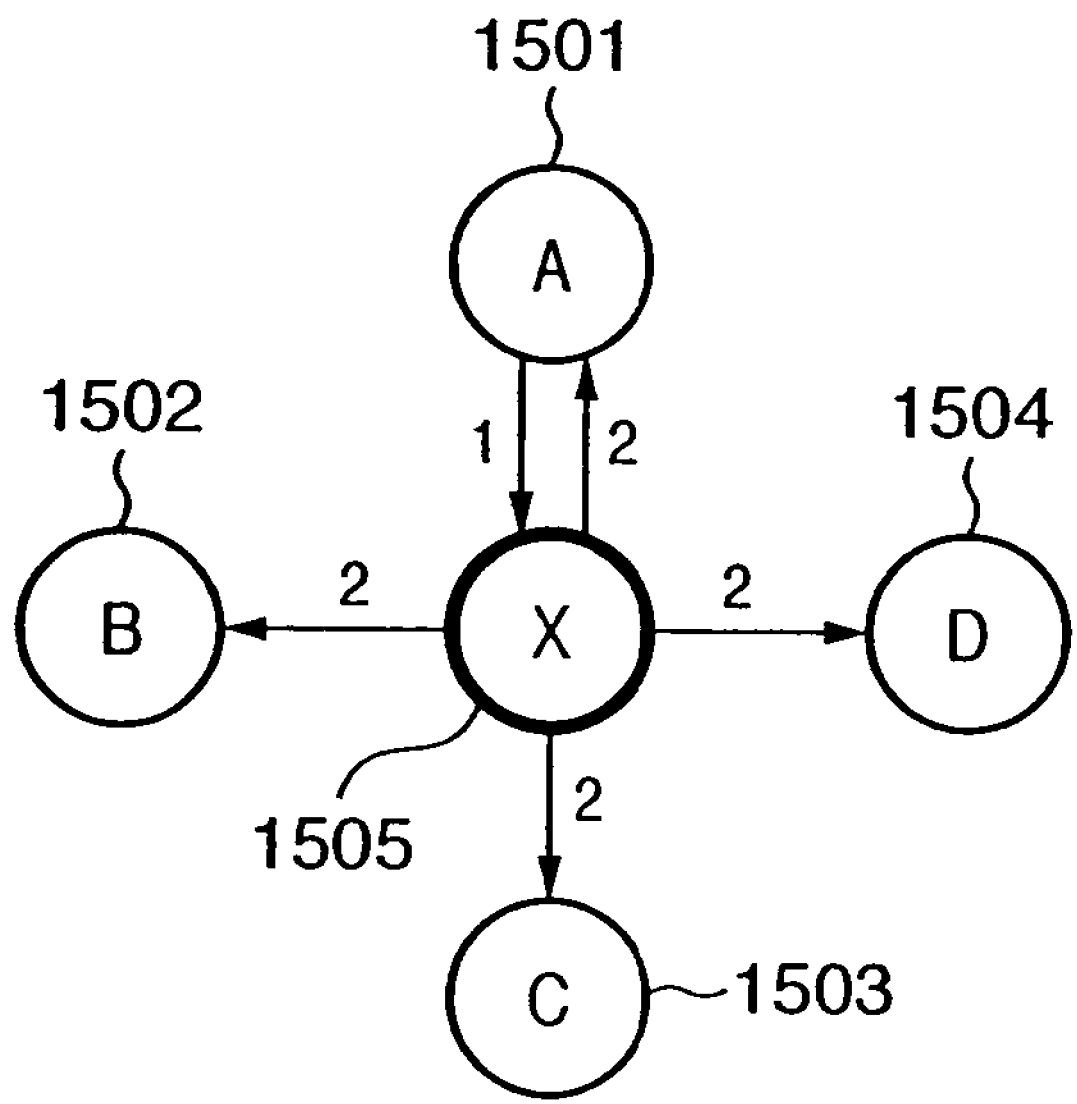
FIG. 15 illustrates a basic information transmission method among processes in the system shown in FIG. 14.

FIG. 15 shows the basic information flow upon updating the shared databases in the system of this embodiment. In FIG. 15, reference symbols A, B, C, and D (1501 to 1504) denote clients; and X (1505), a server. Assume that client A 1501 has generated a manipulation instruction of a shared database. The contents of the manipulation instruction are transmitted to server X 1505 via a network (not shown) (arrow 1). Server X 1505 distributes the manipulation instruction transmitted from client A 1501 to all clients A to D (1501 to 1504) including client A 1501 as the source (arrow 2). In this way, by distributing the manipulation instruction received by server X 1505 to all the clients, the contents of the manipulation instruction issued by an arbitrary client can be detected by all the clients.

Figure 16:
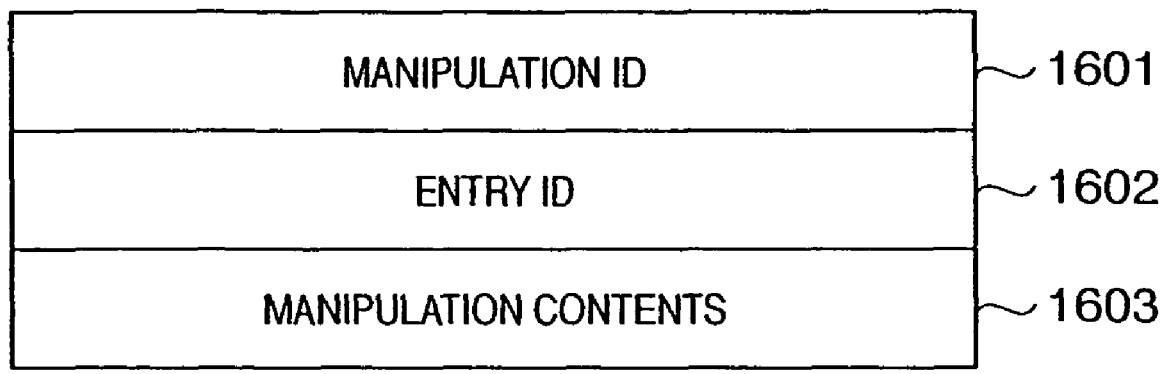
FIG. 16 shows an example of the format of event data used in the system shown in FIG. 14.

FIG. 16 shows the data format of a manipulation instruction. The manipulation instruction is formed of a plurality of fields. A manipulation ID field 1601 stores a number which is used to uniquely identify the type of manipulation, and is assigned when the manipulation instruction is issued at each client. An entry ID 1602 stores a number which is used to uniquely identify an entry, and is assigned upon loading a file that describes the database contents. A manipulation content field 1603 stores the concrete contents of the manipulation instruction. For example, when a manipulation that sets the object level to a given value has been made, the field 1603 stores the setting value of the object level. In the following description of this embodiment, data of one manipulation instruction with the format shown in FIG. 16 will be referred to as "event".

<Client Process>

The client and server processes will be described in detail below.

Figure 17:
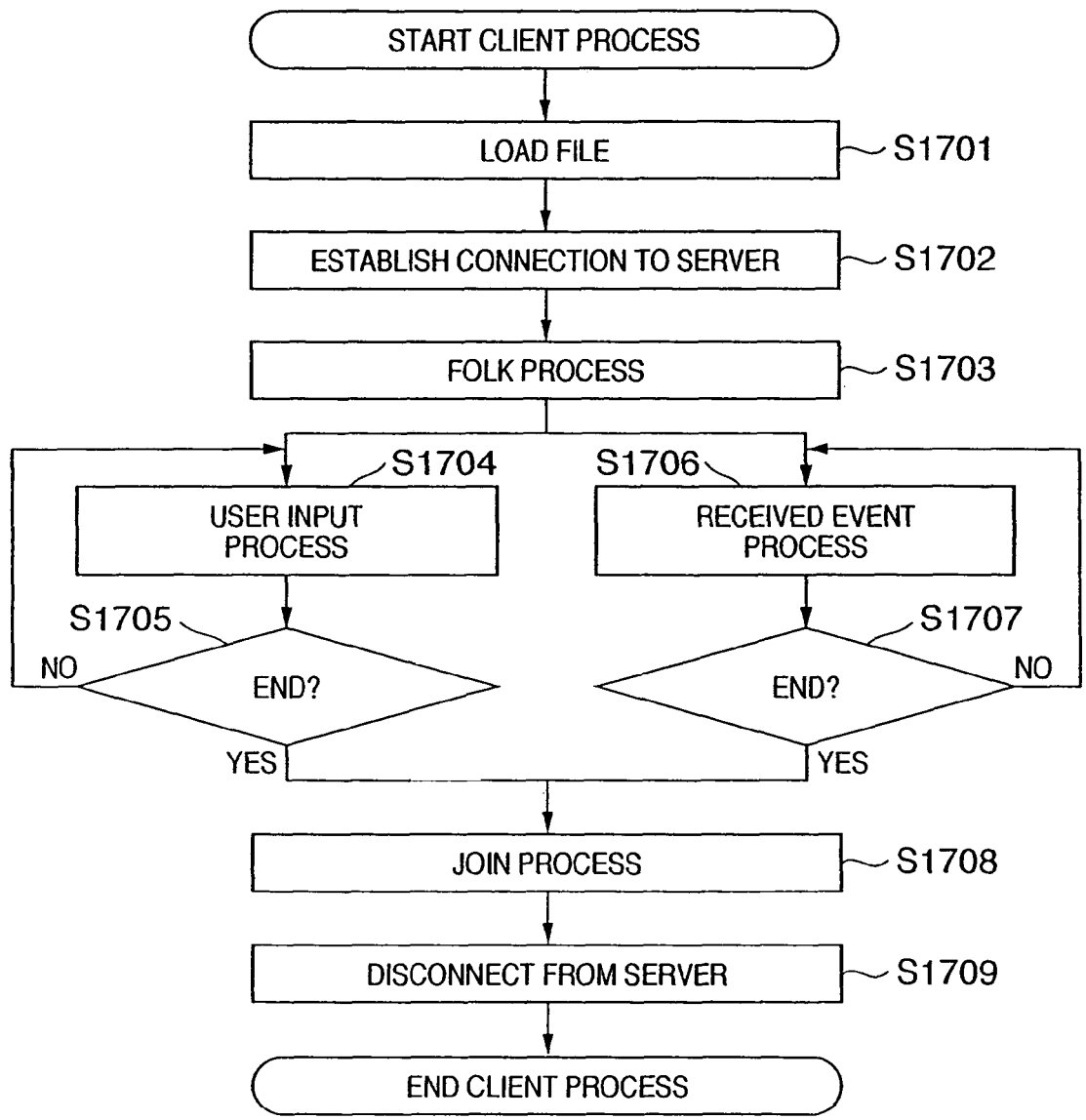
FIG. 17 is a flowchart showing an example of a client process in the fourth embodiment.

FIG. 17 shows the overall flow of the process in the client. When the client is started up, it loads a file that describes the virtual space from the external storage device 105 (FIG. 13) in step S1701 to build a database on the memory 102. In this embodiment, since each individual client individually holds a common database, the databases held by respective clients must have common contents, and the file to be loaded in step S1701 has the same contents for all the clients. The client establishes network connection to the server 1311 (FIG. 14) (step S1702). At this time, the server 1311 assigns a client ID. The client ID is unique information and is assigned to an event to be issued by the client later so as to identify the source of the information. Note that data exchange between the client and server is attained by a one-to-one socket communication using the TCP/IP protocol. Therefore, the server 1311 has socket communication paths as many as at least the number of clients.

In step S1703, the process forks to launch a user input process (step S1704) for processing the user input, and a received event process (step S1706) for processing an event received from the server. Note that a process for generating projected images of CG objects is also launched (not shown in FIG. 17). Since this projected image generation process is known as the CG image generation method, a detailed description thereof will be omitted. The user input process and received event process will be described in detail later.

In each of the user input process and received event process, it is checked in step S1705 or S1707 if a process end instruction is detected. If NO in step S1705 or S1707, the flow returns to step S1704 or S1706 to continuously process the user input or received event. On the other hand, if YES in step S1705 or S1707, the processes are joined in step S1708. Network connection to the server is disconnected (step S1709), thus ending all processes.

(User Input Process)

Figure 18:
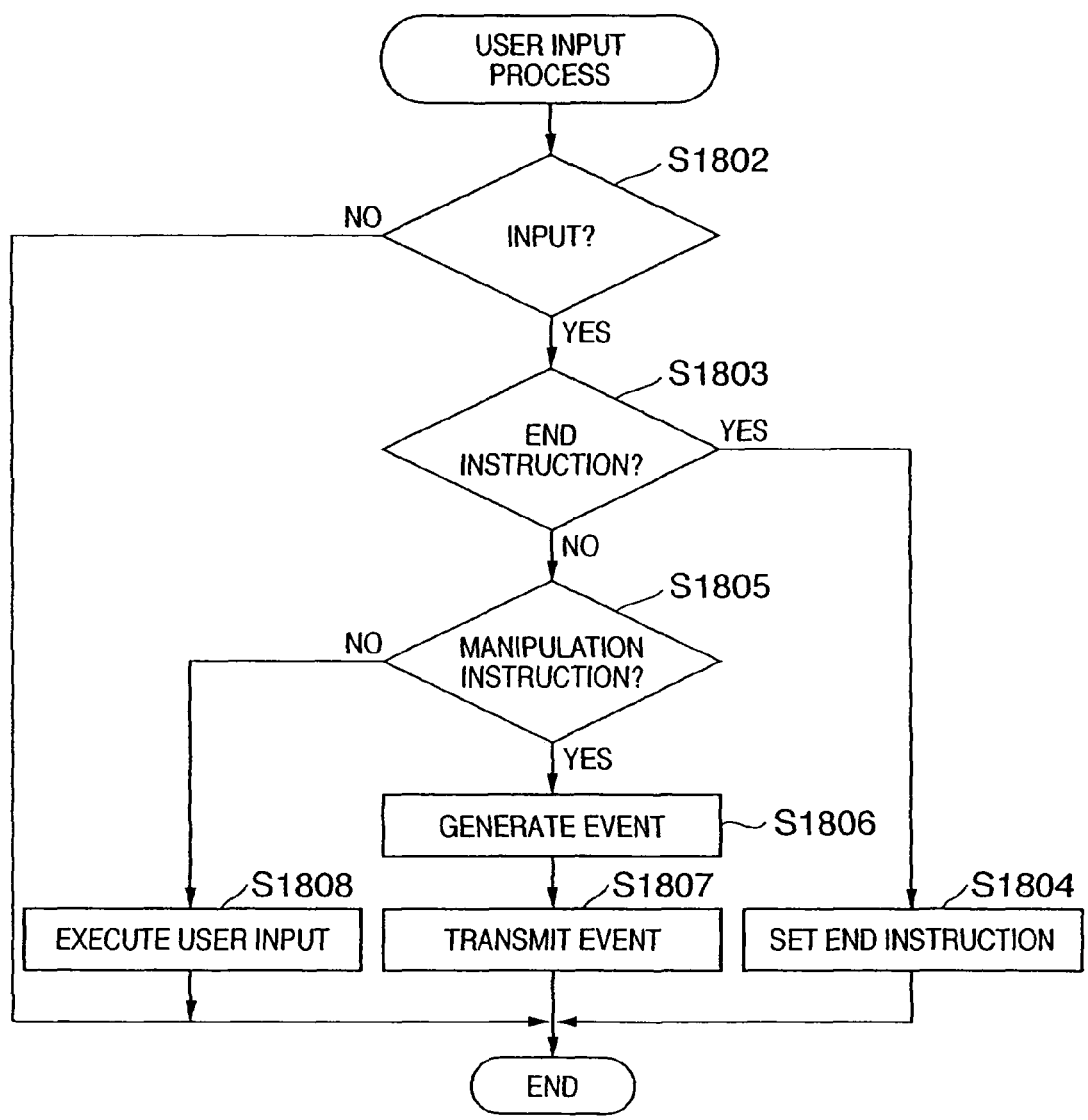
FIG. 18 is a flowchart showing details of a user input process in FIG. 17.

The user input process in step S1704 will be described in detail below using FIG. 18. Initially, the presence/absence of the user input is checked in step S1802. If the user input is detected, the flow advances to step S1803; otherwise, the user input process ends.

It is checked in step S1803 if the user input is a program end instruction. If the user instructs to end a program, an end instruction is issued to processes other than the self process, which form a program in step S1804, thus ending the user input process. On the other hand, if no program end instruction is input in step S1803, the flow advances to step S1805.

It is checked in step S1805 if the user input is a manipulation of the shared database, i.e., a manipulation instruction. If the user input is a manipulation instruction, an event (see FIG. 16) is generated based on the contents of the manipulation instruction in step S1806. The generated event is transmitted to the server in step S1807.

If it is determined in step S1805 that the user input contents do not indicate a manipulation instruction, the input contents are executed in step S1808.

The operation of the practical user input process executed when the user has changed the object level will be explained below. If the user has changed the object level, the user input is detected in step S1802, and it is determined in step S1803 that no end process is made. The flow then advances to step S1805. The manipulation instruction is detected in step S1805. An event which includes a setting value of the object level is generated in step S1806, and is transmitted to the server in step S1807.

On the other hand, if the user has changed the user level, the same processes as those upon changing the object level are done before step S1805. However, it is determined in step S1805 that the user input is not a manipulation instruction, and the setting value of the user level is changed in step S1808, thus ending the user input process.

(Received Event Process)

Figure 19:
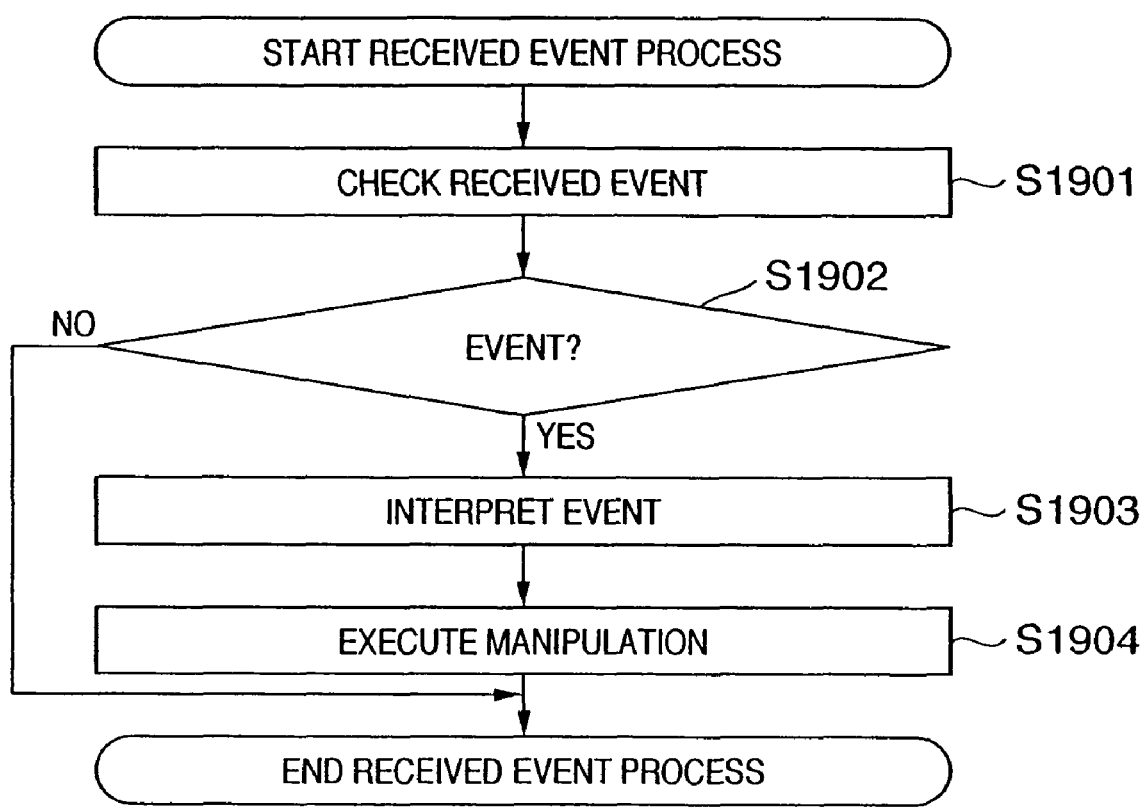
FIG. 19 is a flowchart showing details of a reception event process in FIG. 17.

The received event process in step S1706 (FIG. 17) will be described in detail below. FIG. 19 shows the flow of the received event process. A received event is received from the server via the communication unit 1310, and is input to a received event buffer as a predetermined area on the memory 102.

In step S1901, the received event buffer is searched. It is checked in step S1902 if an event is input to the received event buffer. If a received event is found, the flow advances to step S1903. On the other hand, if it is determined that no received event is present, the received event process ends. If a received event is found, that event data is interpreted to extract the contents of a manipulation instruction (step S1903). In step S1904, a manipulation described in the event is executed. For example, if an event that instructs to change the object level is found, the object level is set to be a setting value included in the event, and the same level reflection process as in FIG. 7 is then executed.

<Server Process>

Figure 20:
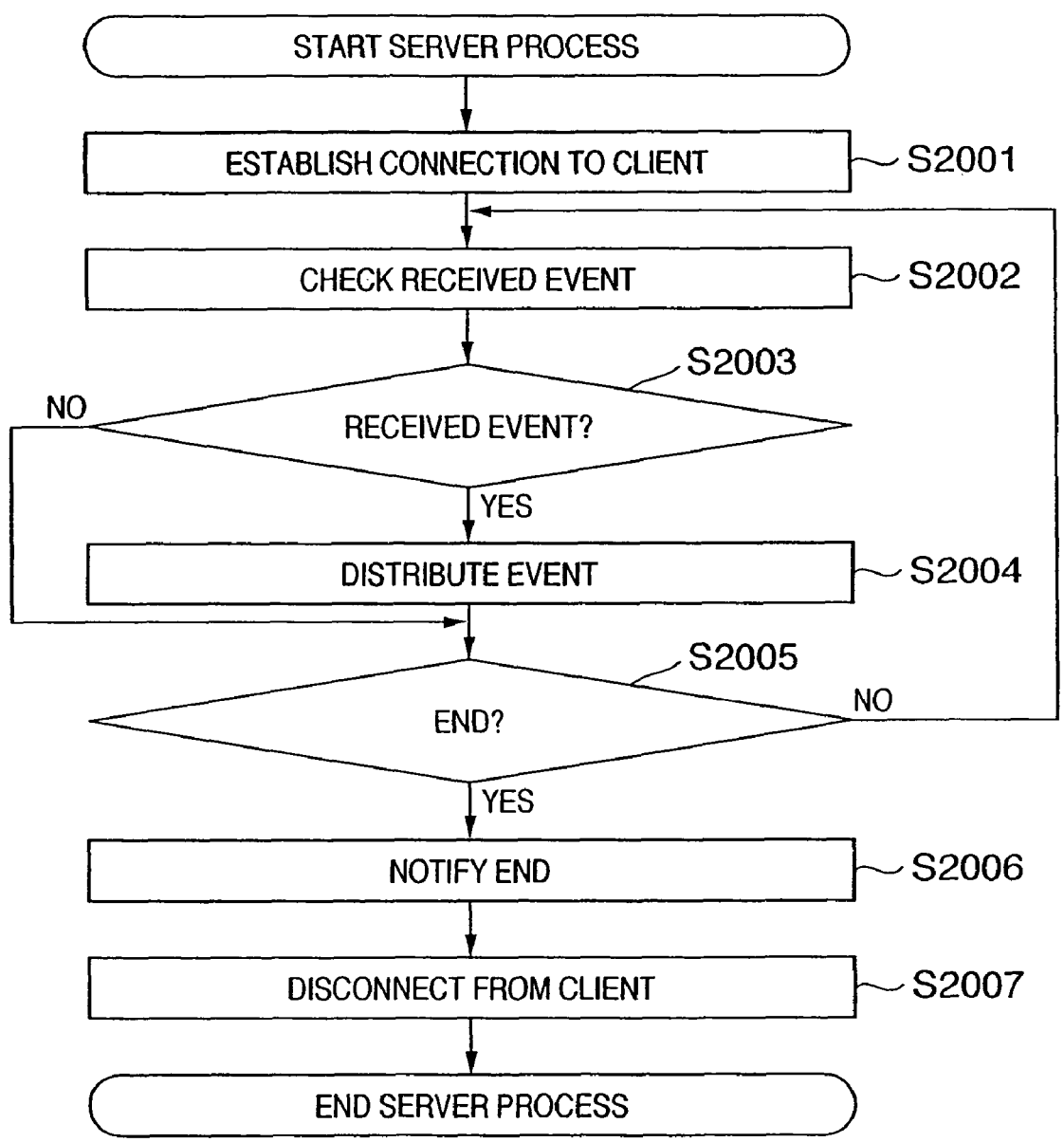
FIG. 20 is a flowchart showing an example of a server process in the fourth embodiment.

The flow of the client process has been explained. The flow of the server process will be described in detail below using FIG. 20.

In step S2001, the server accepts connection requests from clients to establish a communication. At this time, the server notifies the clients of unique client IDs. The server then searches the received event buffer (step S2002) to check if a received event is present (step S2003). If a received event is found, the flow advances to step S2004; otherwise, the flow jumps to step S2005. In step S2004, the server transmits the event to the connected clients. It is checked in step S2005 if the server process is to end in response to a user's instruction (e.g., an arbitrary key on the keyboard 106 is assigned as an end key, and a user's end instruction is determined upon depression of that key). If the server process is to end, the flow advances to step S2006; otherwise, the flow returns to step S2002. In step S2006, the server notifies the connected clients that the process is to end, and disconnects connection to the clients (step S2007), thus ending the process.

As described above, according to the information processing apparatus of this embodiment, since each individual program independently sets the user level while setting common object levels among a plurality of programs as reference upon determining the attributes of the objects, the attributes of the objects can be controlled.

In this embodiment, the plurality of programs share the object level and each individual program sets the user level. However, the user level may be shared, but the object level may not be shared, or both the user and object levels can be shared.

The method of sharing data among the plurality of programs can use an arbitrary method other than the aforementioned method.

Fifth Embodiment

In the first to fourth embodiments, one object level is set per object. However, a plurality of object levels may be set per object.

At this time, each object level may be assigned to one attribute, or a plurality of object levels may be applied per attribute.

As an example of the former kind, one object level may be assigned to the visibility attribute, and another object level may be used for the opacity.

As an example of the latter kind, two object levels may be used for the- visibility attribute. When the user level falls between the two object levels, the visibility attribute is set to be visible; otherwise, it is set to be invisible.

Sixth Embodiment

In the first to fifth embodiments, one user level is commonly applied to all attributes. Alternatively, a plurality of user levels may be set for each program, user, process, or the like, and different user levels may be applied in correspondence with attributes. That is, a plurality of user levels are set for each program, user, process, or the like, and the aforementioned process is executed in correspondence with the relationship between, e.g., the visibility attribute and opacity attribute and different user levels.

Seventh Embodiment

In the first to sixth embodiments, the object and user levels are expressed by floating-point values ranging from 0.0 to 1.0. However, the type and range of level values are not limited to them. For example, an integer ranging from 0 to 100 or a flag indicating logically true or false may be used.

Eighth Embodiment

In the first to seventh embodiments, the method of determining the attribute of a CG object on the basis of the user and object levels is determined in advance, and the user cannot change that method. Alternatively, the user may be allowed to change that method. For example, a call-back function that implements a desired algorithm for determining the attribute of a CG object on the basis of the user and object levels may be registered in association with the object or its attribute, and that call-back function may be launched before the rendering process to determine the attribute.

If the call-back function is registered while the predetermined attribute determination method is available, the method implemented by the call-back function is used to determine the attribute in place of the predetermined method. If another call-back function is re-registered while the call-back function has already been registered, a method implemented by the newly registered call-back function is used to determine the attribute. If the call-back function has already been registered and that registration is canceled, the predetermined attribute determination method is used to determine the attribute. In this way, when the call-back function is registered and re-registered, or its registration is canceled, the method of determining the attribute of each CG object can be arbitrarily changed.

Ninth Embodiment

In the first to eighth embodiments, an object to be controlled is an attribute set for each CG object. However, an objective to be controlled is not particularly limited as long as it is information that defines a virtual space by an attribute (e.g., a node of a scene graph).

Note that the scene graph is a data structure prevalently used in the field of computer graphics so as to represent the structure and attributes of a virtual space. Also, the node is a minimum unit that determines the structure of the scene graph, and has one or a plurality of attributes.

10th Embodiment

This embodiment will exemplify a case wherein a setting value of a "visibility attribute" that determines whether or not a projected image of a CG object in a virtual space is to be displayed (or generated) for each terminal is shared.

The overall arrangement of a virtual space sharing system which includes an information processing apparatus of this embodiment can be equivalent to that of the database sharing system shown in FIG. 14.

The term "database manipulation" used in the following description will be explained. A "manipulation" of a database indicates a procedure for rewriting the contents of a database in an arbitrary process having a shared database. The database manipulation is classified into two processes, i.e., "manipulation instruction" and "manipulation execution". The manipulation instruction is an update request of the database, and does not actually rewrite the contents. The actual rewrite process of the database is executed in the manipulation execution process. Hence, "manipulation" will indicate "database manipulation" herein unless otherwise specified. If a manipulation objective is other than a shared database, the manipulation objective is specified like "interactive device manipulation by the user".

Note that the manipulation instruction may be generated by the user or by a process during an operation. As an example of the former kind, the manipulation instruction is generated when the user has moved a virtual object (CG object) by manipulating an interactive device such as a mouse or the like. On the other hand, as an example of the latter kind, the manipulation instruction is generated when, e.g., a game program has algorithmically moved/rotated an enemy character in a shooting game system.

The basic information flow upon updating the database is as has been explained using FIG. 15. Also, the hardware arrangement of the information processing apparatus according to this embodiment is the same as that shown in FIG. 13 that has been explained in the fourth embodiment.

<Client Process>

The client and server processes will be described in detail below.

FIG. 21 shows the overall flow of the client process. When the client is started up, it loads a scene description file that describes the virtual space from the external storage device 105 (FIG. 13) in step S401 to build a scene graph database on the memory 102 (FIG. 13). In this embodiment, since each client individually holds a common database, the databases to be held by respective clients must have common contents. That is, the files to be loaded in step S401 have common contents among all clients. The contents of the scene description file and those of the scene database to be built on the memory 102 will be described later.

The client establishes network connection to the server (step S402). At this time, the server assigns a client ID which is used to identify each client. The client ID is unique information and is assigned to information to be issued by the client later so as to identify the source of the information. Note that data exchange between the client and server is attained by a one-to-one socket communication using the TCP/IP protocol. Therefore, the server has socket communication paths as many as at least the number of clients.

In step S403, the process forks to launch a manipulation process (step S404) for processing a manipulation instruction, and a received event process (step. S406) for processing an event received from the server. Note that a process for generating a CG image of the virtual space (projected image of a virtual object) with reference to the scene graph database is also launched (not shown in FIG. 21). Since the projected image generation process is known as the CG image generation method, a detailed description thereof will be omitted. The manipulation process and received event process will be described in detail later. In each of the manipulation process and received event process, it is checked in step S405 or S407 if a process end instruction is detected. If NO in step S405 or S407, the flow returns to step S404 or S406 to continuously process the manipulation instruction or received event. On the other hand, if YES in step S405 or S407, the processes are joined in step S408. Network connection to the server is disconnected (step S409), thus ending all processes.

<Received Event Process>

Note that the received event process in step S406 is the same as that in the flowchart of FIG. 19 that has been explained in the fourth embodiment, and a description thereof will be omitted. In step S1904 of this received event process, the setting value of data of the designated entry ID 801 (FIG. 25) is changed in accordance with manipulation contents 802.

<Configuration of Scene Description File>

An example of the configuration of a scene description file loaded by the client in step S401 in this embodiment will be explained below.

Figure 22:
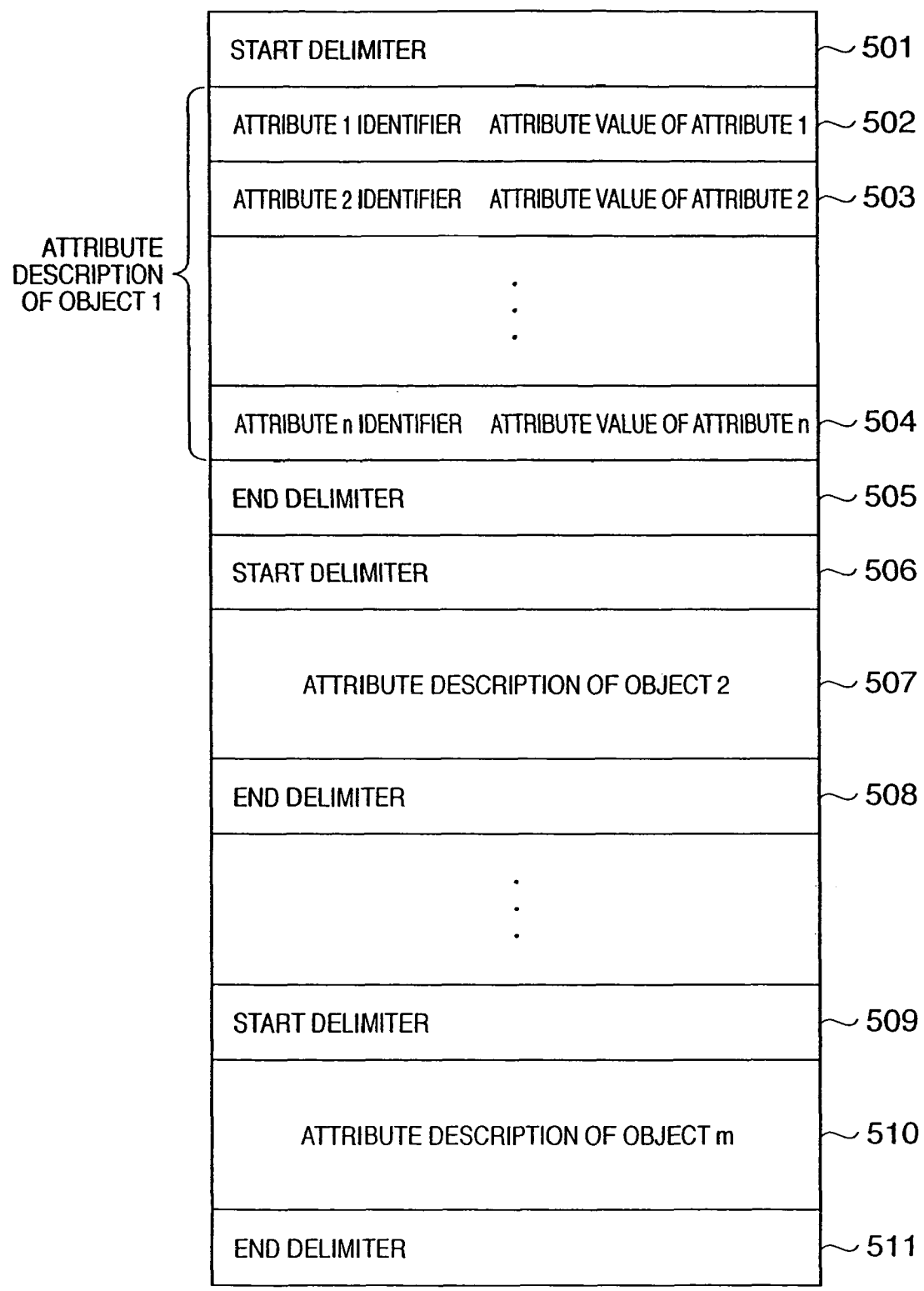
FIG. 22 shows a description file format example of a database.

FIG. 22 shows an example of the configuration of the scene description file with m CG objects. The attributes of each CG object are described in fields bounded by start and end delimiters. In FIG. 22, the start delimiters of the first, second, and m-th objects are respectively denoted by 501, 506, and 509.

On the other hand, the end delimiters of these objects are 505, 508, and 511. Each attribute of an object is described as a pair of an identifier used to identify that attribute, and an attribute value, as indicated by 502 to 504. The visibility attribute of each CG object is described by an identifier of the visibility attribute and its value. Although not shown in FIG. 22, a file header which includes the type of file (scene description file), the number of CG objects included, and the like, EOF data indicating the end of file, and the like may be actually included.

<Configuration of Shared Database>

Figure 23:
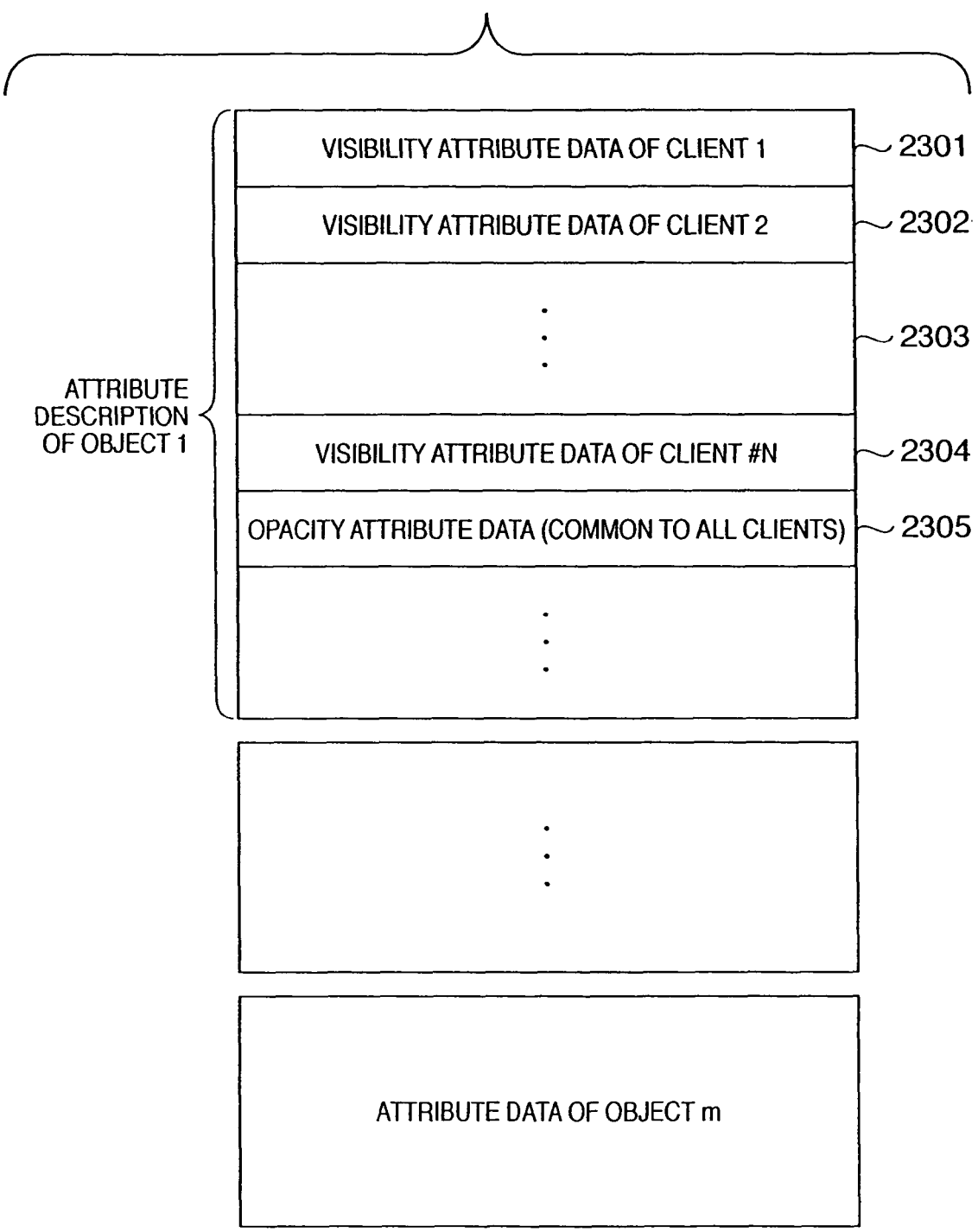
FIG. 23 shows an example of the data structure of a shared database in the 10th embodiment.

FIG. 23 shows an example of the structure of the shared database which is formed on the memory when the client loads the scene description file shown in FIG. 22 in step S401. The client forms the database while classifying n attributes of each object into an attribute whose value can be set for each client (to be referred to as an "independent attribute" hereinafter) and an attribute whose value is shared by all clients (to be referred to as a "common attribute" hereinafter), on the basis of information which is set in advance.

Assume that the visibility attribute of, e.g., those of object 1 is an independent attribute, and opacity attribute is a common attribute. As shown in FIG. 23, a database having visibility attribute fields (2301 to 2304) corresponding to a maximum number (N) of clients, which is determined in advance by the virtual space sharing system of this embodiment, and one opacity attribute field (2305), is formed.

The attribute initial value of each client in the independent attribute may be arbitrarily determined. For example, a method of setting an attribute value described in, e.g., a scene description file as an attribute initial value for all the clients, a method of setting initial values for each client together with information that represents the type of attribute, and using these setting values, and the like may be used.

In this way, a database for all attributes and all objects included in the scene description file is formed. Note that each object need not always have both independent and common attributes, and may have either one of these types of attributes.

<Manipulation Process>

Figure 24:
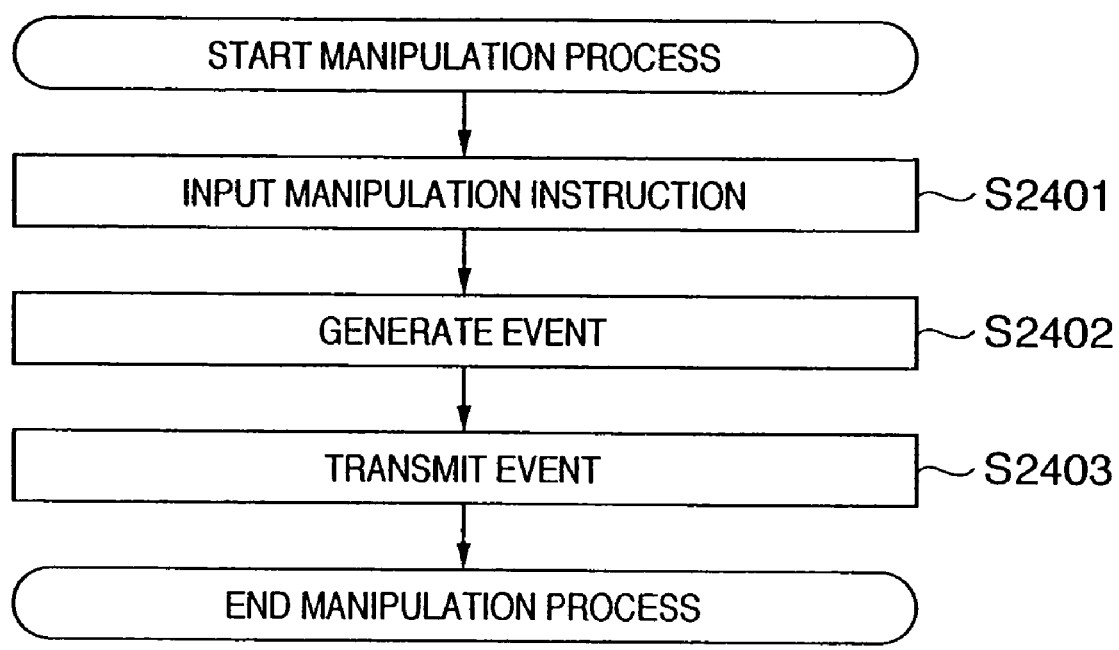
FIG. 24 is a flowchart showing details of a manipulation process in FIG. 21.

The manipulation process in step S404 will be described in detail below with reference to FIG. 24. Initially, the contents of a manipulation instruction are input in step S2401. The input method of the manipulation instruction will be described below.

Event data is generated on the basis of the manipulation contents input in step S2401 (step S2402). The generated event data is transmitted to the server in step S2403.

FIG. 25 shows the data structure of an event which is issued from the client to the server or vice versa. The event data includes two fields.

An entry ID field 801 stores a number used to uniquely identify an entry (data) which is included in a shared database formed and held by each client, and is assigned by the client upon forming the database. For example, upon forming the database shown in FIG. 23, entry IDs are assigned like 1, 2, 3, . . . in turn from the first field 2301. Therefore, if the value of the entry ID field 801 is "3", a manipulation to the visibility attribute value of client 3 can be specified.

A manipulation contents field 802 stores practical contents of a manipulation instruction. In case of a manipulation for setting a visibility attribute, field 802 stores an attribute value indicating a visible or invisible state.

Note that the configuration of event data is not limited to that shown in FIG. 25 but event data may have an arbitrary configuration as long as the client that received the event data can specify a manipulation objective and manipulation contents (data value) with respect to data in a shared database.

Figure 26:
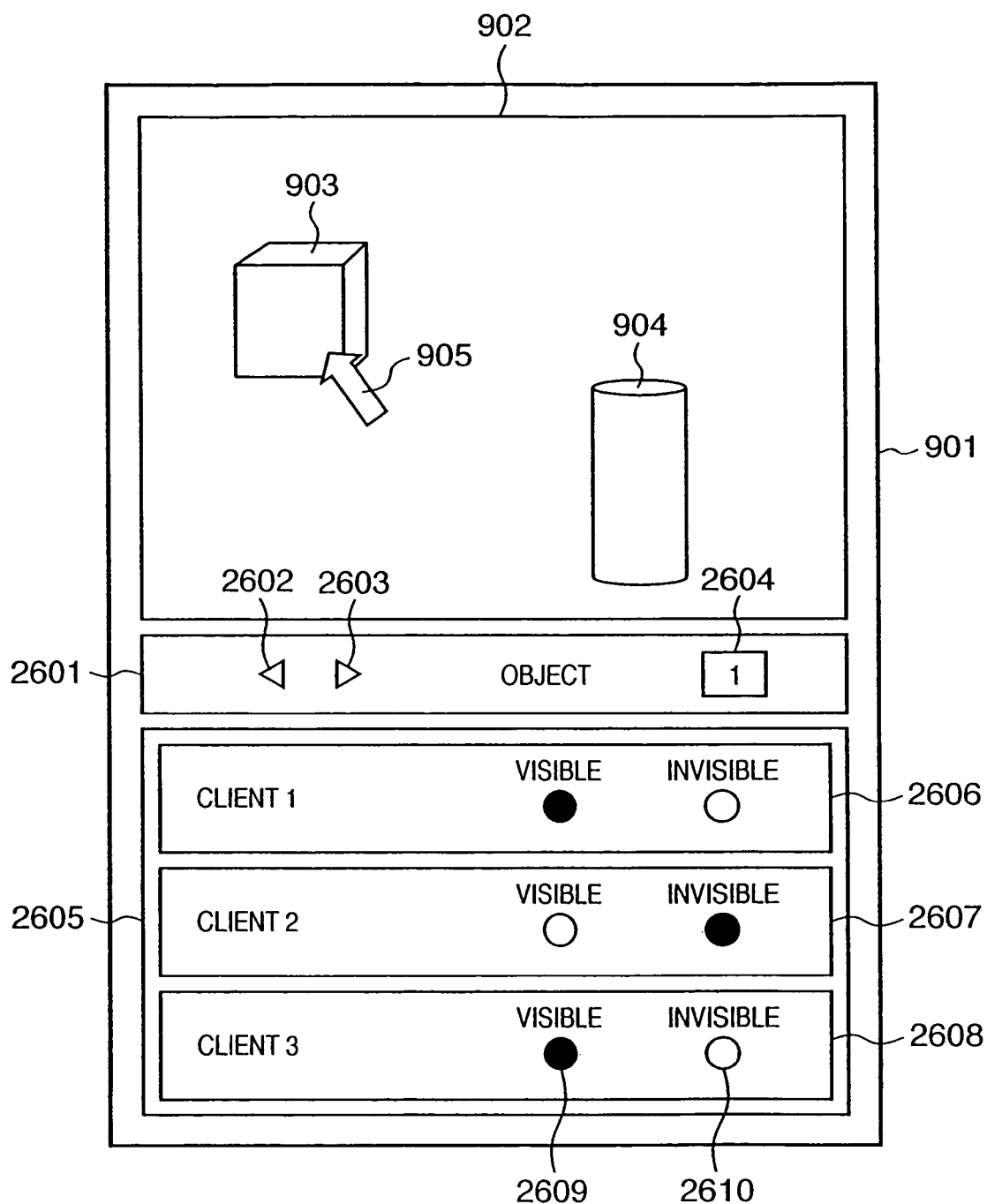
FIG. 26 shows an example of a client display window in the 10th embodiment.

FIG. 26 shows a window display example made by the client (e.g., client #1) of the system of this embodiment. A 3D space display area 902 in a display window 901 displays projected images of 3D virtual objects 903 and 904 as CG objects. The position of a mouse cursor 905 changes in synchronism with the movement of a mouse (107 in FIG. 13).

An object select area 2601 for selecting a specific CG object is displayed below the 3D display area 902: The object select area 2601 includes an object number decrement button 2602, object number increment button 2603, and object number indicator 2604. When the user sets the mouse cursor 905 on the object number decrement button 2602 and clicks the mouse button, a CG object with a number smaller by one than that of the currently selected CG object is selected. Conversely, when the object number increment button 2603 is used, a CG object with a number larger by one can be selected. The object number indicator 2604 displays the number of the selected object. In the example of FIG. 26, the first object is selected, and corresponds to the CG object 903 of the rectangular solid.

Note that the CG object (with the visibility attribute="visible") displayed on the 2D display area 902 can be directly selected by setting the mouse cursor 905 to the CG object to be selected and clicking the mouse button without using the object select area 2601. Even when the CG object is selected by the mouse, the object number indicator 2604 of the object select area 2601 displays the umber of the currently selected CG object.

An attribute setting area 2605 used to browse and set an independent attribute of the selected CG object is displayed below the object select area 2601. When the selected CG object has a plurality of independent attributes, an attribute setting area (not shown) used to select which of independent attributes is browsed and set is displayed in the same format as the object select area 2601. Note that the selected CG object 903 has only a visibility attribute as an independent attribute for the sake of simplicity and easy understanding.

The attribute setting area 2605 is divided into setting fields for respective clients. FIG. 26 exemplifies a case wherein the number of clients is 3, and the attribute setting area 2605 is divided into setting fields 2606 to 2608 corresponding to clients #1 to #3. The attribute setting fields 2606 to 2608 of respective clients have radio buttons used to set the visibility attributes. For example, radio buttons 2609 and 2610 assured on the setting field 2608 corresponding to the third client are respectively used to set the visibility attribute of the selected objects (CG object 903 in the example of FIG. 26) associated with the third client to be "visible" and "invisible".

The state of the radio button of the setting field corresponding to each client indicates the current setting value of the visibility attribute. In the example of FIG. 26, clients #1 to #3 are respectively set to be visible, invisible, and visible in association with the rectangular solid object 903. At this time, in client #1, "visible" as the setting value of the visibility attribute associated with the first object of client #1 is output from the shared database held by the client process in response to a use request of the visibility attribute of the rectangular solid object 903, which is issued from the projected image generation process that folks in step S403, and the projected image of the rectangular solid object 903 is consequently displayed, as shown in FIG. 26.

In order to change the visibility attribute, the user selects an object, the attribute value of which is to be changed, using the object select area 2601 or mouse cursor 905. At this time, radio buttons corresponding to the visibility attributes of respective clients set for that object are selectively displayed.

Of the radio buttons on the attribute setting area 2605, the user sets the mouse cursor 905 to that corresponding to a desired client and desired visibility attribute, and clicks the mouse button to enable it. In this manner, the visibility attribute for each client can be set according to the user's request by user's interactive operation.

Figure 27:
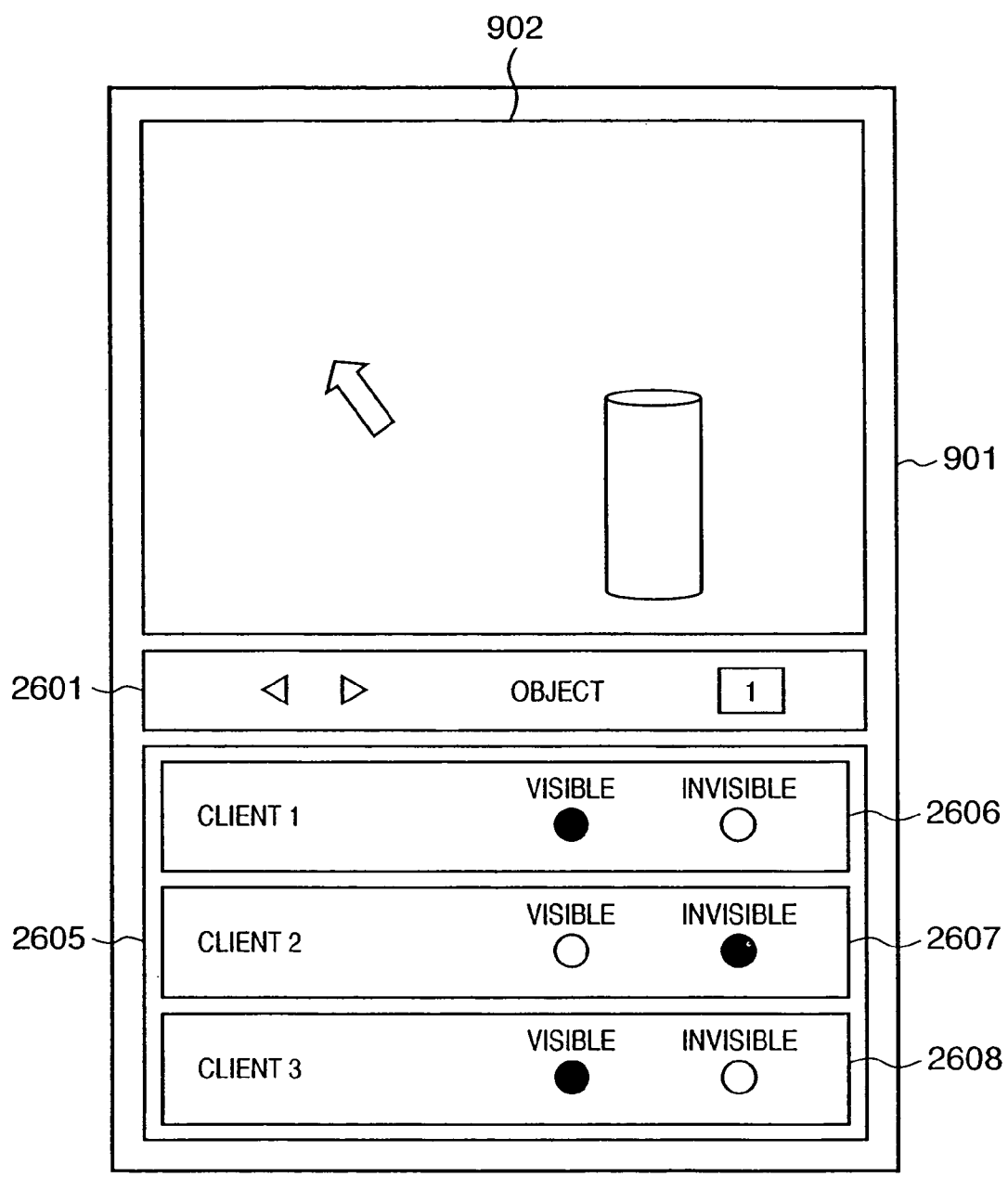
FIG. 27 shows another example of a client display window in the 10th embodiment.

FIG. 27 shows a window display example on client #2 when the visibility attributes are set, as shown in FIG. 26. In client #2, since the visibility attribute of the first object (rectangular solid) 903 is set to be "invisible", the visibility attribute of the rectangular solid object 903 is output as "invisible" to the projected image generation process in client #2, and no projected image of the rectangular solid object 903 is generated.

<Server Process>

The process on the server side will be explained below.

The server also sequentially stores events received from clients via the communication unit 1310 on a received event buffer as a predetermined area on the memory 102. After that, the server executes the server process by the same process as that in the flowchart of FIG. 20 that has been explained in the fourth embodiment.

As described above, according to this embodiment, each client can browse and set or change setting values of other clients with respect to attributes (independent attributes) which can be set for each client, and consistency of visibility attribute data can be maintained in all clients.

In this embodiment, the visibility attribute is shared among clients as the independent attribute of each CG object. Also, other arbitrary attributes (e.g., the scales of objects and the like) can be shared as independent attributes. Furthermore, an arbitrary number of independent attributes may be shared.

Moreover, the attributes of nodes of a scene graph which forms the virtual space may be shared in place of those of virtual objects.

Note that the scene graph is a data structure prevalently used in the field of computer graphics so as to represent the structure and attributes of a virtual space. Also, the node is a minimum unit that determines the structure of the scene graph, and has one or a plurality of attributes.

In this embodiment, the visibility attribute that can assume only two states has been exemplified as an attribute for the sake of simplicity. However, as for an attribute such as opacity which can assume a continuous value falling within a predetermined range, an attribute value setting area can be defined by a GUI such as a slide bar, a text box that allows direct input of a numerical value, and the like, which is normally used to set a numerical value in place of the radio buttons.

11th Embodiment

The 10th embodiment allows all the clients to use attribute data (setting values of independent attributes) independently assigned to each individual client.

However, in the 10th embodiment, the type of attribute is fixed to one of independent and common attributes. This embodiment will explain an arrangement that can switch the type of an arbitrary attribute of a CG object for each client.

FIG. 28 shows fields associated with a given attribute of the data structure of a shared database formed by each client in this embodiment.

Data that holds a common attribute value is allocated in a field 1301, and data to be held for the first to N-th clients are allocated in fields 1302 to 1305. Note that N is a maximum number of clients which is determined in advance in the virtual space sharing system of this embodiment. Data corresponding to each client includes data that holds an independent attribute value, and flag data called "independent flag". The independent flag is used to designate whether the client uses the common or independent attribute value, in a process using this attribute such as a projected image generation process of a CG object, or the like. More specifically, if the independent flag=ON, the independent attribute value of each client is used; if the independent flag=OFF, the common attribute value is used.

For example, in the database shown in FIG. 23, if the visibility attribute of object 1 is a type switchable attribute, the visibility attribute data part of attribute data of object 1 has a format shown in FIG. 28.

In this embodiment, the flows of the client and server processes are the same as those in the 10th embodiment. However, a manipulation for changing the independent flags of respective clients is added as the database manipulation.

Figure 29:
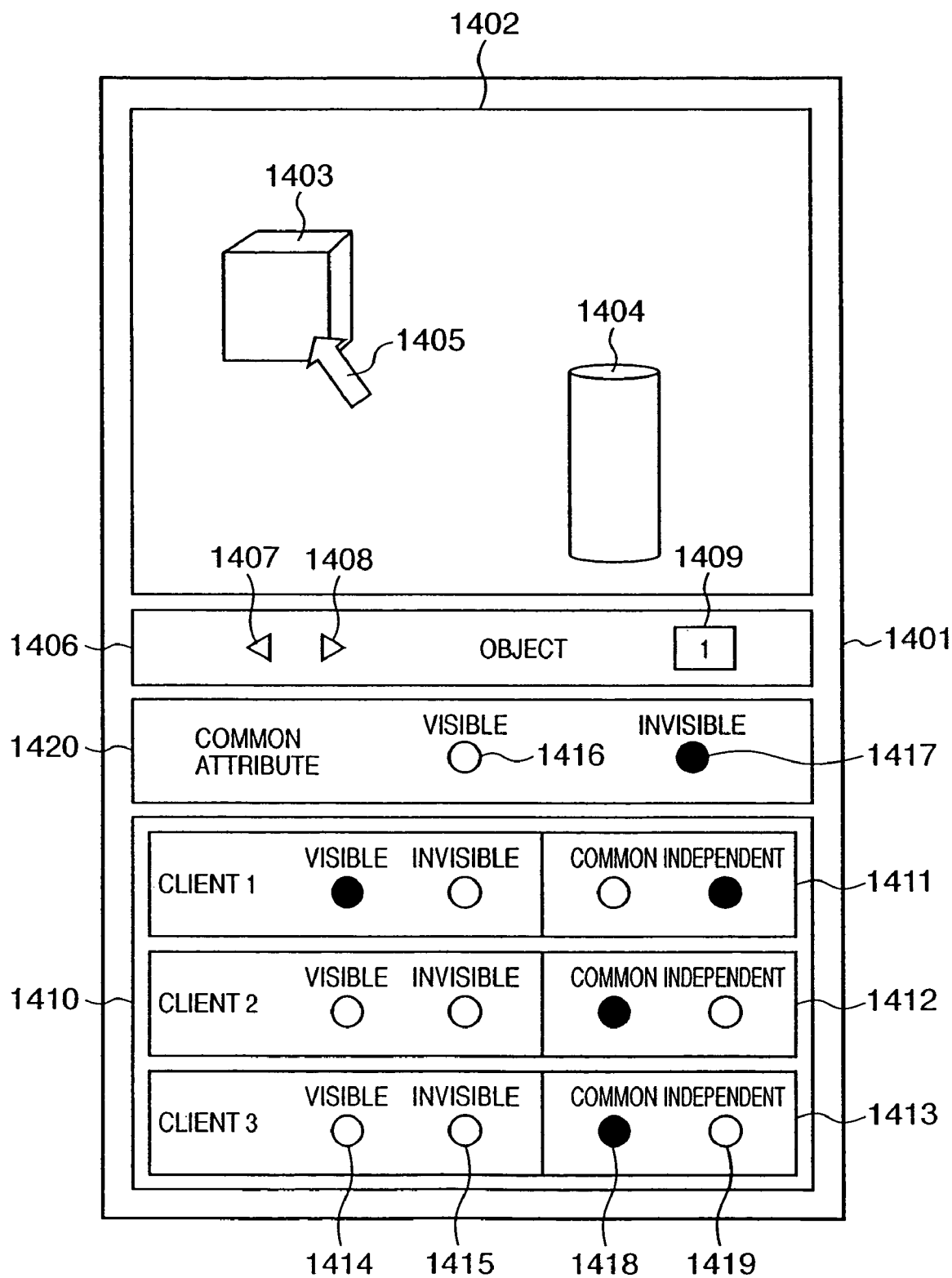
FIG. 29 shows an example of a client display window in the 11th embodiment.

FIG. 29 shows a display example of a window on the first client. In FIG. 29, areas 1401 to 1415 are the same as areas 901 to 915 in FIG. 26. Also, attribute setting fields 1411 to 1413 corresponding to respective clients have not only radio buttons 1414 and 1415 used to set attribute values but also radio buttons 1418 and 1419 used to set whether each client uses a common or independent attribute value (i.e., to set the independent flag data in FIG. 28).

In FIG. 29, a new common attribute setting area 1420 having radio buttons 1416 and 1417 is added. As in the 10th embodiment, assume that a CG object has only a visibility attribute for the sake of simplicity.

The radio buttons 1416 and 1417 of the common attribute setting area 1420 are used to set the common attribute value of the visibility attribute as that of a currently selected CG object 1403 to be visible or invisible. In FIG. 29, the common attribute value is set to be invisible. Attribute setting fields 1411 to 1413 corresponding to respective clients include radio buttons (e.g., 1418 and 1419) used to set independent flags. In case of FIG. 29, independent flags of clients #1, #2, and #3 are respectively ON, OFF, and OFF.

That is, client #1 is set to use the independent attribute value as the visibility attribute, and the independent attribute=visible. Therefore, client #1 outputs "visible" as the setting value of the visibility attribute associated with the first object of client #1 from the shared database held by the client process in response to a use request of the visibility attribute of the rectangular solid object 1403 issued from the projected image generation process, thus consequently displaying a projected image of the rectangular solid object 1403, as shown in FIG. 29.

Figure 30:
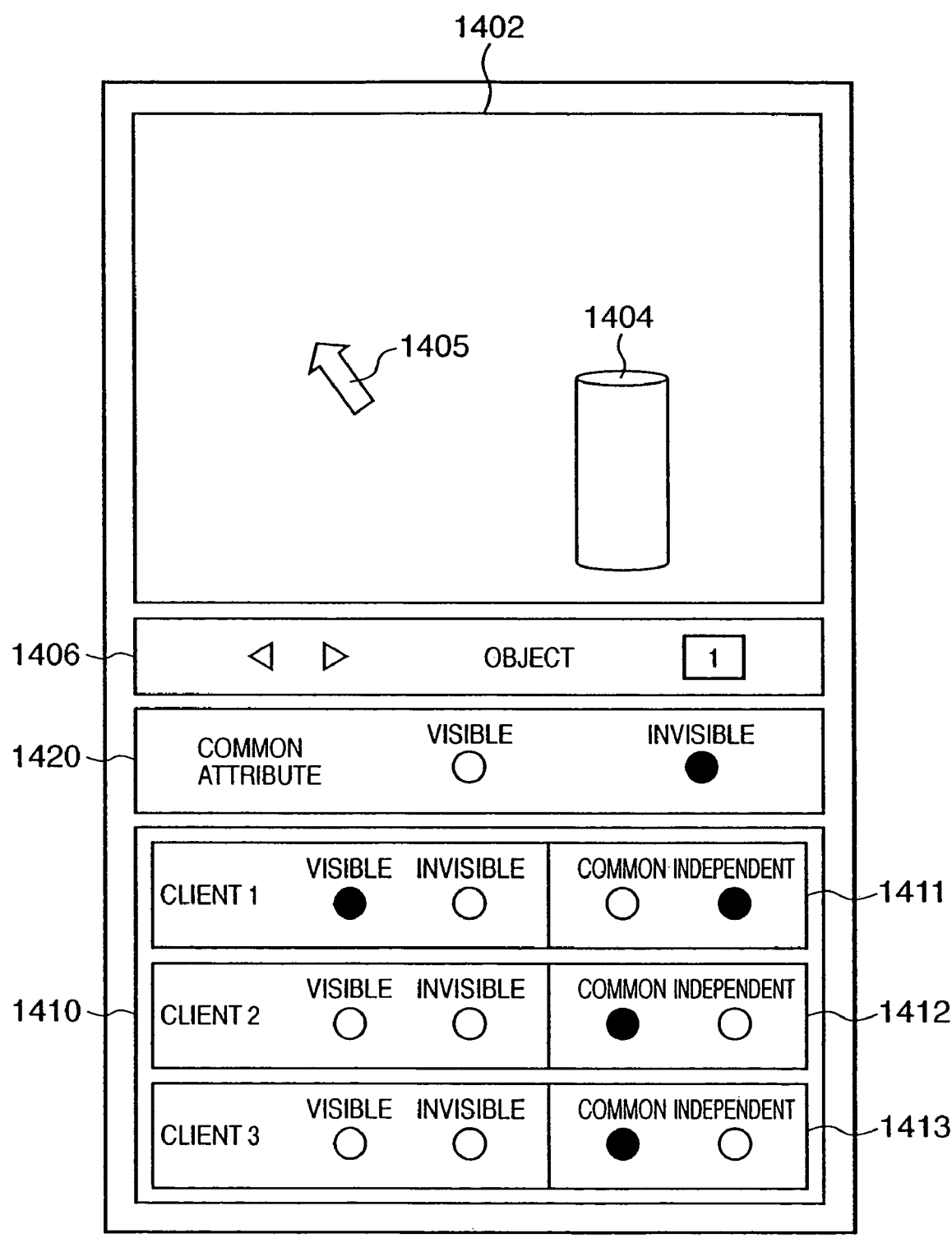
FIG. 30 shows another example of a client display window in the 11th embodiment.

On the other hand, FIG. 30 shows a window display example made on client #2 or #3 in a state wherein the visibility attributes shown in FIG. 29 are set. These clients are set to use the common attribute value as the visibility attribute, and the common attribute value="invisible". Therefore, the setting value "invisible" is output to the projected image generation process in client #2 or #3 irrespective of the independent attribute value of each client, and no projected image of the rectangular solid object 1403 is consequently generated. When the common attribute value is used, the attribute setting units 1411 to 1413 corresponding to respective clients cannot select "visible" or "invisible".

When the user sets a mouse cursor 1405 at the position of the radio button 1416 or 1417, and clicks the mouse button, the button at that position is selected. At this time, a manipulation instruction for setting an attribute assigned to the selected button is generated. For example, if the button 1416 is selected in the state of FIG. 29, the button 1416 is active, the button 1417 is inactive, and a manipulation instruction for setting the common attribute value to be "visible" takes place. After the information associated with this instruction is processed by the received event process of each client, the common attribute value is set to be visible in practice. When the common attribute value is changed from the state in FIG. 29 to "visible", the visibility attribute of the first object in clients #2 and #3 is changed to "visible", and the visibility attribute of the first object 1403 in all the clients as well as client #1 that uses the "visible" independent attribute is set to be "visible".

When the user sets the mouse cursor 1504 at the position of the button used to set the independent flag of each client, and clicks the mouse button, a button at that position is selected. At this time, a manipulation instruction for setting an attribute assigned to the selected button is generated. For example, if the button 1419 is selected in the state in FIG. 29, the button 1418 is inactive, the button 1419 is active, and a manipulation instruction that turning on the independent flag of client #3 takes place. After the information associated with this instruction is processed by the received event process of each client, the independent flag of client #3 is switched to ON in practice.

When the independent flag of client #3 is changed from the state in FIG. 29 to ON, "visible" as the independent attribute value is output from the shared database in response to a use request of the visibility attribute of the rectangular solid object issued from the projected image generation process in client #3. Therefore, the rectangular solid object 1403 changes from an invisible state to a visible state.

As described above, according to this embodiment, which of an attribute value which is independently set for each client and an attribute value common to clients is selected and used can be switched.

When each client loads a file from the external storage device and forms a database, a method of identifying if a common attribute, independent attribute, or one of them is selectable for each attribute of each object may adopt an arbitrary method, i.e., a method of setting identifiers in a database description file in advance, a method of assuring a table which stores identifiers and types in correspondence with each other, and looking it up upon building a database, and so forth. Also, the initial value of each attribute value can be determined by an arbitrary method.

In the above description, the common attribute value is held or changed independently of the independent attribute value. By contrast, the common attribute value may be determined from the independent attribute value. For example, in case of an opacity attribute value (floating-point value) of an object, the average value of independent attribute values may be used as the common attribute value. A logical or arithmetic formula used to determine a common attribute value may be arbitrarily selected. For example, a fixed formula which is assigned to a system in advance may be used, or a formula may be dynamically assigned by a call-back function or the like.

In the above description, assume that one common attribute value is used. However, a plurality of common attribute values may be used. For example, in case of an attribute which can assume a value falling within a predetermined range like opacity described above, a plurality of common attribute values may be prepared, and a desired attribute value may be selected from them as a common attribute value.

12th Embodiment

In the 10th and 11th embodiments, all clients can refer to and set (change) attribute value data in all shared databases. By contrast, this embodiment can limit right of access to shared data to a specific client.

FIG. 31 shows contents associated with one attribute of an arbitrary object in the data structure of the shared database in this embodiment. A field 3101 stores ID number data of a client which has the exclusive control right with respect to all attribute values 3102 to 3105 associated with this attribute. Attribute data, the exclusive control right of which is possessed by a given client, cannot be changed by other clients. Attribute data 3102 to 3105 are assigned to clients #1 to #N. Note that N is the maximum number of clients, which is predetermined in the virtual space sharing system of this embodiment.

The client and server processes of this embodiment are basically the same as those in the 10th embodiment. Note that a manipulation for changing the exclusive control right is added as a database manipulation. Assume that each CG object has one attribute for the sake of simplicity in this embodiment.

Figure 32:
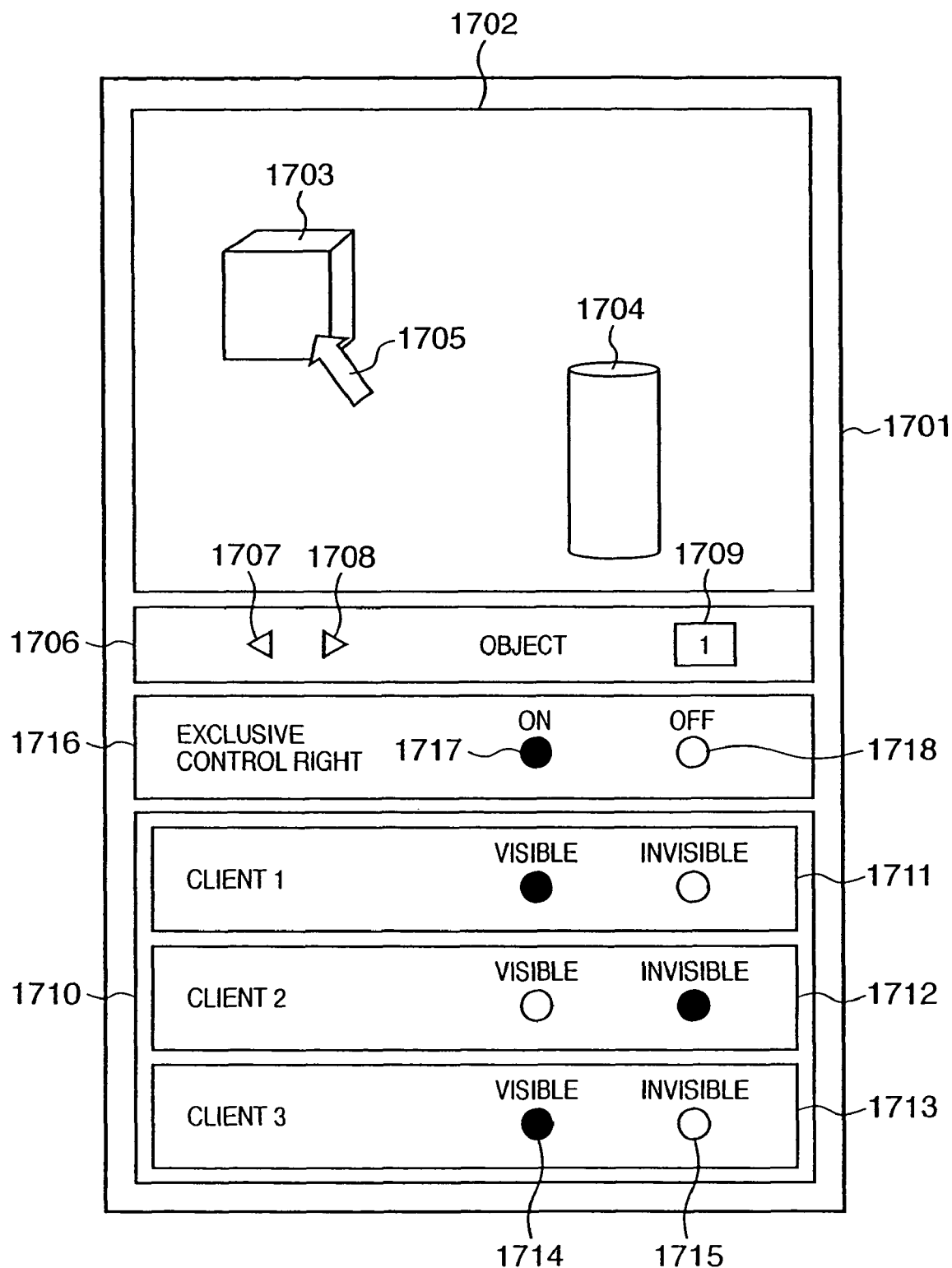
FIG. 32 shows an example of a client display window having an exclusive control right in the 12th embodiment.

FIG. 32 shows an example of a window display on client #1. Areas 1701 to 1715 are the same as the areas 901 to 905 and 2601 to 2610 in FIG. 26. In FIG. 32, an exclusive control right setting area 1716 having radio buttons 1717 and 1718 for setting/canceling the exclusive control right with respect to the self client is added.

In the state of FIG. 32, the exclusive control right associated with the visibility attribute of a first object 1703 is set for the first client. At this time, the field 3101 of the shared database stores the ID number of client #1.

Figure 33:
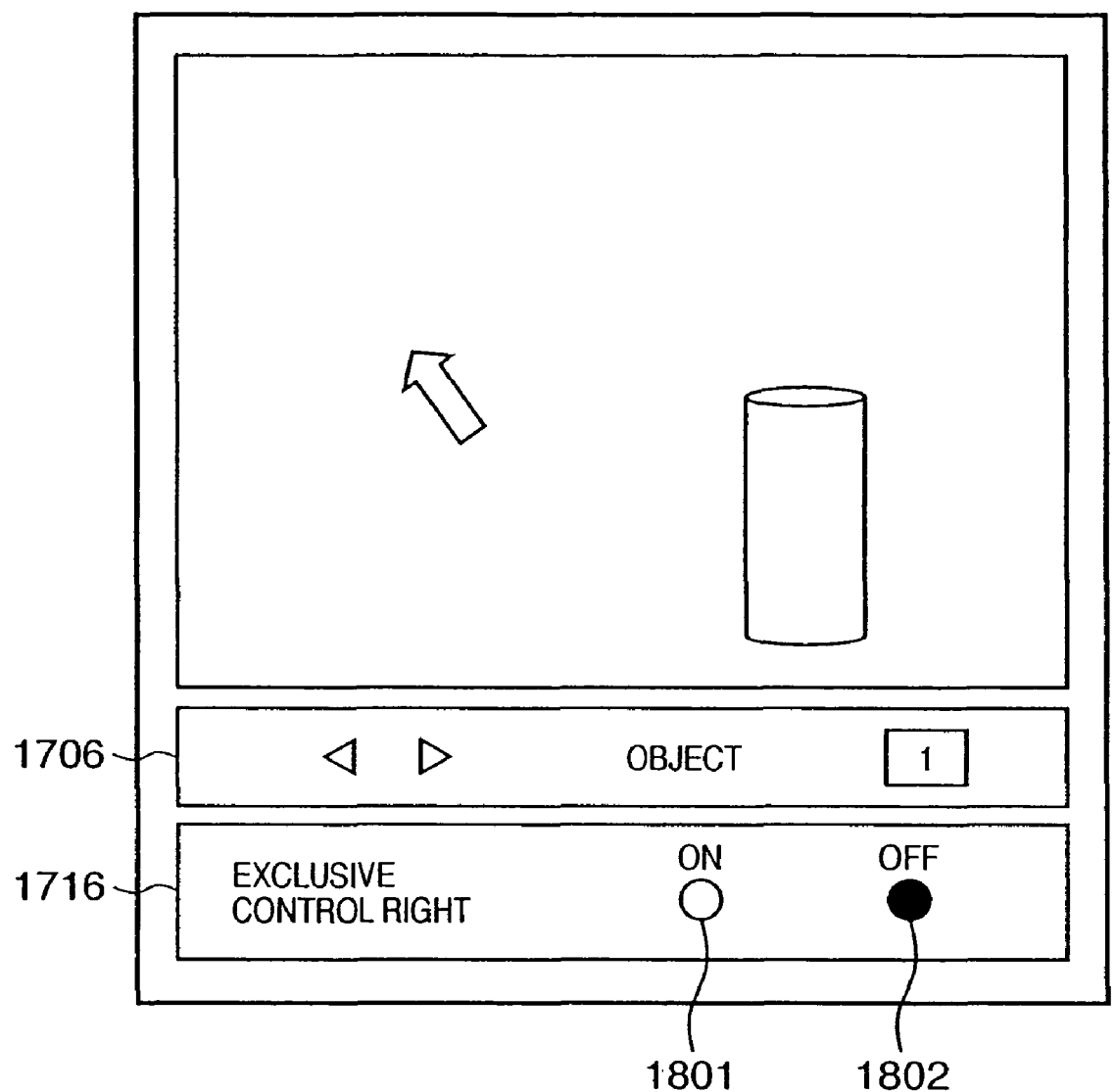
FIG. 33 shows an example of a client display window having no exclusive control right in the 12th embodiment.

On the other hand, FIG. 33 shows a window display example on client #2 corresponding to FIG. 32. Since client #2 has no exclusive control right for the currently selected first CG object 1703, a setting value displayed on the exclusive control right setting area 1716 is OFF. Since client #2 has no exclusive control right for the first object 1703, no visibility attribute setting area 1710 is displayed. Also, the exclusive control right setting area 1716 is displayed, but its setting contents cannot be changed. The user of client #2 can recognize that another client is granted the exclusive control right of the attribute of object 1.

When the user sets a mouse cursor 1705 at the position of the button 1718 and clicks the mouse button in the state shown in FIG. 32 in which client #1 has the exclusive control right, a manipulation instruction for discarding the exclusive control right for the first object is generated. After this instruction is processed by the received event process of each client, the value of the client ID in the data field 3101 in the shared database of each client changes to a value (e.g., 0) which indicates none of clients. The display window of all clients including client #1 is switched to the state of FIG. 32 (the states of the buttons 1717 and 1718 are reversed, and the exclusive control right is turned off).

After that, if the user sets the mouse cursor at the position of a button 1801 and clicks the mouse button on the display window of an arbitrary client (e.g., client #2), a manipulation instruction for acquiring the exclusive control right of the first object by that client is generated. After that instruction is processed by the received event process of each client via the server, the client ID value in the data field 3101 of the shared database is changed to the ID of client #2 (e.g., "2"). The display window of client #2 is switched to the state in FIG. 32, and that of the client other than client #2 (e.g., client #1) is switched to the state of FIG. 33.

As described above, according to this embodiment, a system which shares attribute values of CG objects can set the right that allows a specific client to exclusively refer to and set the specific attribute of a specific CG object. When the client which has that right resigns its right, another client can acquire that client.

For the sake of easy understanding, the process for one CG object having one attribute has been described. In practice, a similar exclusive control right can be set for each of a plurality of attributes of each of a plurality of CG objects. Also, an exclusive control right can be set not only for the independent attribute but also for the common attribute.

In the above description, when the exclusive control right is set for the independent attribute, one exclusive control right which is effective for attribute data of all clients is set. However, when the exclusive control right is assigned to the independent attribute, clients for which that exclusive control right is effective can be arbitrarily set. For example, in the above example, the exclusive control right can be set for each attribute data value of each client.

In the above example, the exclusive control right, which is effective to both refer to and change the attribute, but may be set for one of these processes or independently.

Also, the attribute for which the exclusive control right can be set may be limited. For example, an arbitrary client may set the exclusive control right for only attributes corresponding to the self client. Sharing data associated with the exclusive control right may be a flag indicating if the exclusive control right is set in place of client ID information.

Furthermore, the exclusive control right may be assigned for a plurality of clients in place of each client. In this case, sharing data associated with the exclusive control right corresponds to a list of ID information of clients having the control rights.

The setting of the exclusive control right in this embodiment may be combined with at least one of the 10th and 11th embodiments.

Another Embodiment

In the aforementioned embodiments, a data sharing method can adopt an arbitrary method. For example, the clients and server need not be connected via a LAN using Ethernet®, and the client-server system need not be adopted. A method of maintaining data consistency is not limited to a method of implementing such consistency by communicating information associated with a change in data, as described above. For example, only a server may hold a database, and data may be written in or read out from the database by means of, e.g., RPC (Remote Procedure Call) or the like.

In the fourth and 10th to 12th embodiments, a client that transmitted the event also makes a manipulation by processing the event received via the server. However, only the event source client may make a manipulation before the received event process.

The event includes the source client ID, so that the source client may identify an event transmitted by itself and may avoid repetitive processes.

When the event includes the source client ID, the server need not distribute the event to all the clients, but may distribute the event to clients except for the source client. In this case, the source client ID may be removed from the event to be distributed from the server.

In the above embodiments, an information processing apparatus configured by a single device has been explained, but equivalent functions may be implemented by a system including a plurality of devices.

Note that the present invention includes a case wherein the equivalent functions are achieved by supplying a software program that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magneto optical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the. like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the claims.

Claim of Priority

This application claims priorities from Japanese Patent Application Nos. 2003-358520 and 2003-358521 filed on Oct. 17, 2003, which are hereby incorporated by reference herein.

What is claimed is:

1. A method of processing a plurality of computer graphics objects in a 3-dimensional virtual space, comprising:
    an object level acquisition step of acquiring respective object levels set for each of a plurality of computer graphics objects;
    a user level determination step of determining a user level set by the user;
    a calculation step of calculating respective opacity attribute values of the plurality of computer graphics objects from a ratio of the acquired object levels of each of the plurality of computer graphics objects and the determined user level, wherein the opacity attribute values are proportional to the ratio and are calculated by multiplying the ratio of the determined user level to the acquired object levels by a predetermined maximum value of opacity;
    a comparing step of comparing the opacity attribute values calculated in the calculation step to the predetermined maximum opacity to determine an output opacity for each of the plurality of computer graphics objects, wherein (i) if the calculated opacity attribute value is equal to or larger than the predetermined maximum opacity, the opacity of the object is set to be the predetermined maximum opacity, (ii) if the calculated opacity attribute value is smaller than the predetermined minimum opacity, the opacity of the object is set to be the predetermined minimum opacity, and (iii) if the calculated opacity attribute value is smaller than predetermined maximum opacity and equal to or larger than the predetermined minimum opacity, the opacity of the object is set to be the opacity attribute value calculated for the plurality of computer graphics object in the calculation step; and
    a rendering step of rendering the 3-dimensional virtual space comprising the plurality of computer graphics objects by rendering, based on a predetermined angle of view and the opacity attribute values determined in the comparing step, each of the plurality of computer objects,
    wherein the rendering step is repeatedly performed in response to a determination of the user level in the user level determination step.

2. A non-transitory computer-readable medium encoded with a computer program for making a computer execute a method of processing a plurality of computer-graphics objects in 3-dimensional virtual space, comprising:
    an object level acquisition step of acquiring respective object levels set for each of a plurality of computer graphics objects;
    a user level determination step of determining a user level set by the user;
    a calculation step of calculating respective opacity attribute values of the plurality of computer graphics objects from a ratio of the acquired object levels of each of the plurality of computer graphics objects and the determined user level, wherein the opacity attribute values are proportional to the ratio and are calculated by multiplying the ratio of the determined user level to the acquired object levels by a predetermined maximum value of opacity;
    a comparing step of comparing the opacity attribute values calculated in the calculation step to the predetermined maximum opacity to determine an output opacity for each of the plurality of computer graphics objects, wherein (i) if the calculated opacity attribute value is equal to or larger than the predetermined maximum opacity, the opacity of the object is set to be the predetermined maximum opacity, (ii) if the calculated opacity attribute value is smaller than the predetermined minimum opacity, the opacity of the object is set to be the predetermined minimum opacity, and (iii) if the calculated opacity attribute value is smaller than predetermined maximum opacity and equal to or larger than the predetermined minimum opacity, the opacity of the object is set to be the opacity attribute value calculated for the plurality of computer graphics object in the calculation step; and
    a rendering step of rendering the 3-dimensional virtual space comprising the plurality of computer graphics objects by rendering, based on a predetermined angle of view and the opacity attribute values determined in the comparing step, each of the plurality of computer objects,
    wherein the rendering step is repeatedly performed in response to a determination of the user level in the user level determination step.

* * * * *